United States Patent
Kim et al.

(10) Patent No.: US 11,586,211 B2
(45) Date of Patent: Feb. 21, 2023

(54) AI MOBILE ROBOT FOR LEARNING OBSTACLE AND METHOD OF CONTROLLING THE SAME

(71) Applicant: LG ELECTRONICS INC., Seoul (KR)

(72) Inventors: Junghwan Kim, Seoul (KR); Yongjae Lee, Seoul (KR); Minho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 16/759,118

(22) PCT Filed: Oct. 25, 2018

(86) PCT No.: PCT/KR2018/012688
§ 371 (c)(1),
(2) Date: Apr. 24, 2020

(87) PCT Pub. No.: WO2019/083291
PCT Pub. Date: May 2, 2019

(65) Prior Publication Data
US 2020/0341479 A1    Oct. 29, 2020

(30) Foreign Application Priority Data

Oct. 25, 2017  (KR) .................. 10-2017-0139495
Feb. 12, 2018  (KR) .................. 10-2018-0017204

(51) Int. Cl.
*G05D 1/02*       (2020.01)
*G06T 7/70*       (2017.01)
(Continued)

(52) U.S. Cl.
CPC ............ *G05D 1/0221* (2013.01); *A47L 9/009* (2013.01); *A47L 9/2826* (2013.01); *A47L 9/2852* (2013.01);
(Continued)

(58) Field of Classification Search
CPC .............. G05D 1/0221; G05D 1/0223; G05D 1/0242; G05D 1/0248; G05D 1/0251;
(Continued)

(56) References Cited

U.S. PATENT DOCUMENTS 4,751,658 A * 6/1988 Kadonoff ................. B25J 19/02
                                                            901/1
4,962,453 A * 10/1990 Pong, Jr. .............. A47L 11/4011
                                                            180/167
(Continued)

FOREIGN PATENT DOCUMENTS

CN     105433878     3/2016
CN     105751230     7/2016
(Continued)

OTHER PUBLICATIONS

European Search Report dated Jul. 6, 2021 issued in Application No. 18870615.4.
(Continued)

*Primary Examiner* — Bhavesh V Amin
(74) *Attorney, Agent, or Firm* — Ked & Associates, LLP

(57) ABSTRACT

An artificial intelligence (AI) mobile robot and a method of controlling the same for learning an obstacle are configured to capture an image while traveling through an image acquirer, to store a plurality of captured image data, to determine an obstacle from image data, to set a response motion corresponding to the obstacle, and to operate the set response motion depending on the obstacle, and thus, the obstacle is recognized through the captured image data, the
(Continued)

obstacle is easily determined by repeatedly learning an image, and the obstacle is determined before the obstacle is detected or from a time point of detecting the obstacle to perform an operation of a response motion, and even if the same detection signal is input when a plurality of different obstacles is detected, the obstacle is determined through the image and different operations are performed depending on the obstacle to respond to various obstacles, and accordingly, the obstacle is effectively avoided and an operation is performed depending on a type of the obstacle.

18 Claims, 15 Drawing Sheets

(51) Int. Cl.
    *B60W 60/00*     (2020.01)
    *A47L 9/00*     (2006.01)
    *A47L 9/28*     (2006.01)
    *G06T 7/20*     (2017.01)

(52) U.S. Cl.
    CPC ........ *A47L 9/2894* (2013.01); *B60W 60/0011* (2020.02); *G05D 1/0223* (2013.01); *G05D 1/0242* (2013.01); *G05D 1/0248* (2013.01); *G05D 1/0251* (2013.01); *G05D 1/0255* (2013.01); *G06T 7/20* (2013.01); *G06T 7/70* (2017.01); *A47L 2201/04* (2013.01); *B60W 2420/42* (2013.01); *B60W 2554/40* (2020.02); *G05D 2201/0215* (2013.01); *G06T 2207/30261* (2013.01)

(58) Field of Classification Search
    CPC ......... G05D 1/0255; G05D 2201/0215; G05D 2201/0203; A47L 9/009; A47L 9/2826; A47L 9/2852; A47L 9/2894; A47L 2201/04; A47L 9/28; B60W 60/0011; B60W 2420/42; B60W 2554/40; G06T 7/20; G06T 7/70; G06T 2207/30261; G06V 20/10; B25J 9/16; B25J 11/00; B25J 19/02; B25J 19/06
    See application file for complete search history.

(56) References Cited

U.S. PATENT DOCUMENTS

| | | | | |
|---|---|---|---|---|
| 5,006,988 | A * | 4/1991 | Borenstein | G05D 1/0255 701/25 |
| 5,040,116 | A * | 8/1991 | Evans, Jr. | G05D 1/0246 701/28 |
| 5,319,611 | A * | 6/1994 | Korba | G01S 7/52003 367/909 |
| 5,321,614 | A * | 6/1994 | Ashworth | G05D 1/0227 318/587 |
| 5,819,008 | A * | 10/1998 | Asama | G05D 1/0242 701/1 |
| 6,240,342 | B1 * | 5/2001 | Fiegert | G05D 1/0219 701/410 |
| 6,339,706 | B1 * | 1/2002 | Tillgren | G10L 15/26 704/E15.045 |
| 6,389,329 | B1 * | 5/2002 | Colens | A47L 9/2805 318/587 |
| 6,487,303 | B1 * | 11/2002 | Yamaguchi | G06T 7/74 382/103 |
| 6,532,404 | B2 * | 3/2003 | Colens | A47L 11/4011 318/587 |
| 6,594,844 | B2 * | 7/2003 | Jones | G05D 1/0238 15/49.1 |
| 6,809,490 | B2 * | 10/2004 | Jones | G05D 1/0219 318/568.17 |
| 7,024,278 | B2 * | 4/2006 | Chiappetta | G05D 1/0225 318/567 |
| 7,031,805 | B2 * | 4/2006 | Lee | B60L 15/2036 700/258 |
| 7,085,624 | B2 * | 8/2006 | Aldred | G05D 1/0255 700/254 |
| 7,206,677 | B2 * | 4/2007 | Hulden | G05D 1/0217 701/25 |
| 7,620,476 | B2 * | 11/2009 | Morse | A47L 11/4088 901/1 |
| 7,957,837 | B2 * | 6/2011 | Ziegler | G05D 1/0246 901/1 |
| 8,009,871 | B2 * | 8/2011 | Rafii | G06T 7/11 250/559.07 |
| 8,190,295 | B1 * | 5/2012 | Garretson | G05D 1/0038 700/245 |
| 8,229,595 | B2 * | 7/2012 | Seelinger | G05D 1/0251 700/250 |
| 8,392,065 | B2 * | 3/2013 | Tolstedt | G05D 1/0214 701/41 |
| 8,577,538 | B2 * | 11/2013 | Lenser | G05D 1/0027 701/28 |
| 8,862,271 | B2 * | 10/2014 | Shamlian | G05D 1/027 700/254 |
| 9,785,148 | B2 * | 10/2017 | Yun | G05D 1/0088 |
| 9,891,630 | B2 * | 2/2018 | Gariepy | G05D 1/0022 |
| 9,919,425 | B2 * | 3/2018 | Bushman | A47L 9/2826 |
| 9,943,206 | B2 * | 4/2018 | Yang | G05D 1/0022 |
| 9,943,959 | B2 * | 4/2018 | Freeman | G05D 1/0278 |
| 10,349,798 | B2 * | 7/2019 | Jun | A47L 9/2826 |
| 2003/0169906 | A1 * | 9/2003 | Gokturk | G06V 20/59 382/190 |
| 2004/0076324 | A1 * | 4/2004 | Burl | G06T 7/246 382/153 |
| 2006/0041333 | A1 * | 2/2006 | Anezaki | G06V 20/64 700/259 |
| 2007/0156286 | A1 * | 7/2007 | Yamauchi | G05D 1/0278 700/245 |
| 2007/0192910 | A1 * | 8/2007 | Vu | B25J 19/06 901/17 |
| 2008/0009965 | A1 * | 1/2008 | Bruemmer | G06N 3/008 701/23 |
| 2008/0027591 | A1 * | 1/2008 | Lenser | G05D 1/0038 701/28 |
| 2009/0043440 | A1 * | 2/2009 | Matsukawa | G05D 1/0238 701/25 |
| 2009/0048727 | A1 * | 2/2009 | Hong | G05D 1/0238 701/26 |
| 2010/0063651 | A1 * | 3/2010 | Anderson | G05D 1/0088 701/1 |
| 2010/0063663 | A1 * | 3/2010 | Tolstedt | G05D 1/0231 701/41 |
| 2010/0063680 | A1 * | 3/2010 | Tolstedt | G05D 1/0214 701/1 |
| 2010/0094499 | A1 * | 4/2010 | Anderson | G05D 1/0295 700/13 |
| 2010/0234993 | A1 * | 9/2010 | Seelinger | G05D 1/0251 700/254 |
| 2011/0108064 | A1 * | 5/2011 | Hillman, Jr. | G05D 1/0246 15/319 |
| 2011/0208357 | A1 * | 8/2011 | Yamauchi | G05D 1/0251 901/1 |
| 2011/0301786 | A1 * | 12/2011 | Allis | G05D 1/0011 701/2 |
| 2012/0173070 | A1 * | 7/2012 | Schnittman | G05D 1/0227 701/26 |
| 2013/0060379 | A1 * | 3/2013 | Choe | G06N 3/008 700/245 |
| 2014/0087660 | A1 * | 3/2014 | Kim | H04B 5/0025 455/41.1 |
| 2014/0087661 | A1 * | 3/2014 | Kim | H04B 5/0025 455/41.1 |
| 2014/0088761 | A1 * | 3/2014 | Shamlian | G05D 1/0227 700/253 |
| 2014/0096030 | A1 * | 4/2014 | Hashiura | H04L 12/6418 715/748 |

(56) References Cited

U.S. PATENT DOCUMENTS

| | | | |
|---|---|---|---|
| 2014/0257622 A1* | 9/2014 | Shamlian | G01B 11/026 701/26 |
| 2015/0020326 A1* | 1/2015 | Schnittman | A47L 11/302 15/52.1 |
| 2015/0120015 A1* | 4/2015 | Fadell | G06Q 10/083 700/90 |
| 2015/0166060 A1* | 6/2015 | Smith | B60W 30/09 701/23 |
| 2015/0197012 A1* | 7/2015 | Schnittman | G05D 1/0272 700/250 |
| 2015/0372832 A1* | 12/2015 | Kortz | H04L 67/1097 700/278 |
| 2016/0320777 A1* | 11/2016 | Yun | G05D 1/0238 |
| 2016/0374526 A1* | 12/2016 | Yang | H04W 4/80 701/23 |
| 2016/0378111 A1* | 12/2016 | Lenser | G05D 1/0088 701/2 |
| 2017/0079499 A1 | 3/2017 | Schnittman et al. | |
| 2017/0357270 A1* | 12/2017 | Russell | G05D 1/0297 |
| 2018/0113468 A1* | 4/2018 | Russell | G05D 1/0297 |
| 2018/0210452 A1* | 7/2018 | Shin | A47L 9/2805 |
| 2020/0050208 A1* | 2/2020 | Frick | G05D 1/0274 |

FOREIGN PATENT DOCUMENTS

| | | |
|---|---|---|
| CN | 105982611 | 10/2016 |
| CN | 106073630 | 11/2016 |
| CN | 107249418 | 10/2017 |
| EP | 3147740 | 3/2017 |
| JP | 2010-009371 A | 1/2010 |
| KR | 10-0662638 B1 | 1/2007 |
| KR | 10-0728225 B1 | 6/2007 |
| KR | 10-1049155 B1 | 7/2011 |
| KR | 10-1772084 B1 | 8/2017 |
| WO | WO 02/101477 | 12/2002 |
| WO | WO 2016/129950 | 8/2016 |

OTHER PUBLICATIONS

International Search Report (with English Translation) and Written Opinion dated Feb. 1, 2019 issued in Application No. PCT/KR2018/012688.

Chinese Office Action dated Sep. 22, 2022 issued in Application No. 201880081516.X.

* cited by examiner (a)

(b)

(a)

(b)

(a)

(b)

(a)

(b)

(a)

(b)

AI MOBILE ROBOT FOR LEARNING OBSTACLE AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2018/012688, filed Oct. 25, 2018, which claims priority to Korean Patent Application Nos. 10-2017-0139495, filed Oct. 25, 2017, and 10-2018-0017204, filed Feb. 12, 2018, whose entire disclosures are hereby incorporated by reference.

TECHNICAL FIELD

The present disclosure relates to a mobile robot and a method of controlling the same, and more particularly, to a mobile robot for traveling a cleaning region, learning an obstacle, and performing cleaning to avoid an obstacle.

BACKGROUND ART

In general, a mobile robot is an apparatus for automatic cleaning by absorbing a foreign substance such as dust from a floor surface while autonomously traveling an area as a cleaning target without manipulation of a user.

Such a mobile robot detects a distance to an obstacle such as furniture, office supplies, a wall, or the like, which is installed within a cleaning area and performs an obstacle avoidance operation.

A mobile robot includes an obstacle detection device such as infrared rays or laser beams as a device for detecting an obstacle. The mobile robot may detect and avoid an obstacle within a predetermined distance based on a detection signal by a sensor such as infrared rays or laser beams.

When an obstacle is detected, if a path is immediately changed, the mobile robot may not be capable of cleaning a corresponding region, and thus, may change the path after approaching the obstacle to the maximum or colliding with the obstacle.

However, when the mobile robot approaches the obstacle for cleaning and collides with the obstacle, there may be a problem in that a target object is damaged due to collision with the mobile robot. For example, there may be a problem in that a pot on a table falls, the obstacle is damaged, or a position of the obstacle is changed.

The mobile robot slips while colliding with the obstacle, and thus, there is a problem in that an error occurs between an actual position and a position determined by the mobile robot.

Thus, it is required to recognize a type of an obstacle and to operate the mobile robot depending on the obstacle.

Korean Patent Publication No. 10-2016-01575 discloses a robot cleaner for recognizing information such as the attributes of the obstacle using image information. Conventionally, in the case of a human foot, a separate recognition module is further configured to easily recognize the human foot. However, conventionally, an obstacle is recognized after the robot cleaner approaches the obstacle, and thus, there is a problem in that a response to the obstacle is actually delayed.

In addition, the mobile robot is basically designed to travel to avoid an obstacle, but there is a limit in recognizing any type of an obstacle. Accordingly, traveling of the mobile robot is impeded, and seriously, the mobile robot is confined not to travel any longer.

Thus, recently, test is performed through various experiments before a product is released, and thus, information on an obstacle is previously learned. However, it is not possible to accumulate information on all obstacles through prior learning due to a restrictive test environment, and thus, a mobile robot has a limit in responding to an obstacle.

CITED REFERENCE

Patent Document

Korean Patent Publication No. 10-2016-01575

Technical Problem

An objective of the present disclosure is to provide a mobile robot and a method of controlling the same for avoiding an obstacle various response motions and escaping from a dangerous situation by capturing an image while traveling, analyzing the feature of the obstacle through a plurality of captured images, and acquiring information on a new obstacle.

Technical Solution

According to the present disclosure, a mobile robot includes a moveable body, an image acquirer configured to capture an image in a traveling direction, an obstacle detection unit configured to detect an obstacle positioned at a side toward the traveling direction, and a controller configured to store a plurality of image data captured through the image acquirer, to start a response motion at a predetermined time point at which the obstacle detection unit determines that the obstacle is positioned within a predetermined distance, and to determine the response motion depending on the determined obstacle based on the image data acquired prior to the predetermined time point.

The controller may set a plurality of response motions to be performed according to a predetermined type of a detection signal input from the obstacle detection unit, and may select any one of the plurality of response motions based on the image data.

The controller may determine whether the obstacle is positioned within a predetermined distance based on a distance from the obstacle, calculated through the detection signal.

The controller may determine the obstacle based on image data captured in the same traveling direction as a traveling direction of the body at a time point of determining that the obstacle is positioned at a predetermined distance.

The mobile robot may transmit the image data to a terminal or a server and may receive information on the obstacle, included in the image data.

According to the present disclosure, a mobile robot may include a moveable body, an image acquirer configured to capture an image in a traveling direction, an obstacle detection unit configured to detect an obstacle positioned at a side toward the traveling direction, and a controller configured to determine whether the body is confined due to the obstacle in response to a traveling state, and to enable the mobile robot to escape from a confinement situation in response to information on the obstacle, acquired from the at least one image data captured prior to the time point of determining confinement.

The mobile robot may include a controller configured to determine whether the body is confined due to the obstacle in response to a traveling state, may transmit the at least one image data captured before a time point of confinement to a server, may set a response motion to prevent the body from being confined in response to obstacle information received from the server, and may avoid the obstacle.

The present disclosure may include a mobile robot configured to analyze the image data based on the pre-stored obstacle information, to determine a type of the obstacle positioned at a side in a traveling direction, and to perform any one of a plurality of response motions on the obstacle at a time point at which the obstacle detection unit determines that the obstacle is positioned within a predetermined distance, and a server configured to analyze image data received from the mobile robot and to acquire obstacle information.

When a confinement situation occurs, the controller may transmit at least one image data captured prior to a predetermined time from a time point of determining confinement of the body or during traveling for a previous predetermined distance to the server.

When the obstacle is an obstacle as a reason for confinement, the controller may perform any one of a plurality of response motions to avoid the obstacle.

The controller may perform any one response motion to output warning for confinement among a plurality of response motions when the obstacle is included in a candidate for causing a confinement situation.

The server may extract the feature of the obstacle as the reason for confinement of the mobile robot, may generate a recognition model for the obstacle, and may generate obstacle information including a response motion for avoiding the obstacle or a response motion for escaping from a confinement situation.

The server may set a candidate for causing confinement with respect to a different obstacle with a similar shape to the obstacle in response to the feature of the obstacle and may generate the obstacle information.

According to the present disclosure, a method of controlling a mobile robot includes, while traveling, capturing an image in a traveling direction and storing image data by an image acquirer, determining that an obstacle is positioned within a predetermined distance through an obstacle detection unit, determining a response motion depending on the determined obstacle based on the image data acquired prior to a predetermined time point of determining that the obstacle is positioned within a predetermined distance, starting a response motion on the obstacle at the predetermined time point, and operating based on the response motion and traveling to avoid and pass through the obstacle.

According to the present disclosure, a method of controlling a mobile robot includes periodically capturing an image in a traveling direction and storing image data through an image acquirer while traveling, determining whether a body is confined due to the obstacle in response to a traveling state, when determining that the body is confined, acquiring obstacle information from at least one image data captured prior to a time point of determining confinement, and escaping from a confinement situation in response to the obstacle information.

The method may further include, when determining that the body is confined, transmitting at least one image data captured prior to a time point of confinement to a server, and setting a response motion to prevent the body from being confinement of the body in response to obstacle information received from the server and to avoid the obstacle.

Advantageous Effects

A mobile robot and a method of controlling the same according to the present disclosure may capture an image while traveling, may analyze a pre-captured image to set a plurality of response motions with respect to an obstacle, and may perform any one of the plurality of response motions, and thus, may perform a predetermined operation depending on an obstacle.

According to the present disclosure, even if the same detection signal is input when a plurality of different obstacles is detected, an obstacle may be determined through an image and different operations may be performed depending on the obstacles.

According to the present disclosure, an image in a traveling direction may be captured while traveling, and thus, an obstacle may be determined through a pre-captured image predetermined point at which the obstacle is positioned within a predetermined distance.

According to the present disclosure, an obstacle may be pre-determined through an image before the obstacle is positioned within a predetermined distance, and thus, a response operation may be immediately performed at a time point at which the obstacle is positioned within the predetermined distance.

According to the present disclosure, whether a mobile robot is confined may be determined depending on a traveling state, at least one pre-captured image before the mobile robot is confined may be analyzed, and an obstacle as the reason for confinement may be extracted.

According to the present disclosure, a response motion of escaping from a confinement situation may be set in response to an obstacle as the reason for confinement, thereby overcoming the confinement situation.

According to the present disclosure, a response motion of avoiding an obstacle as the reason for confinement may be set, thereby preventing confinement in next traveling.

According to the present disclosure, a candidate for causing a confinement situation may be set with respect to another obstacle having the same or similar shape to an obstacle as the reason for confinement, and a response motion may be set for another obstacle, thereby preventing confinement from occurring.

According to the present disclosure, an obstacle may be effectively avoided, an operation may be performed depending on a type of the obstacle, a mobile robot may be prevented from being damaged due to collision with the obstacle, a position error due to collision with the obstacle may be prevented, an environment change in a traveling may be detected, and the mobile robot may be operated.

According to the present disclosure, the mobile robot may perform various responses to an obstacle and may avoid a dangerous situation by acquiring information on a new obstacle through analysis and learning of an obstacle through a server and updating information on an existing obstacle.

DETAILED DESCRIPTION OF THE PREFERRED EMBODIMENTS

Figure 1:
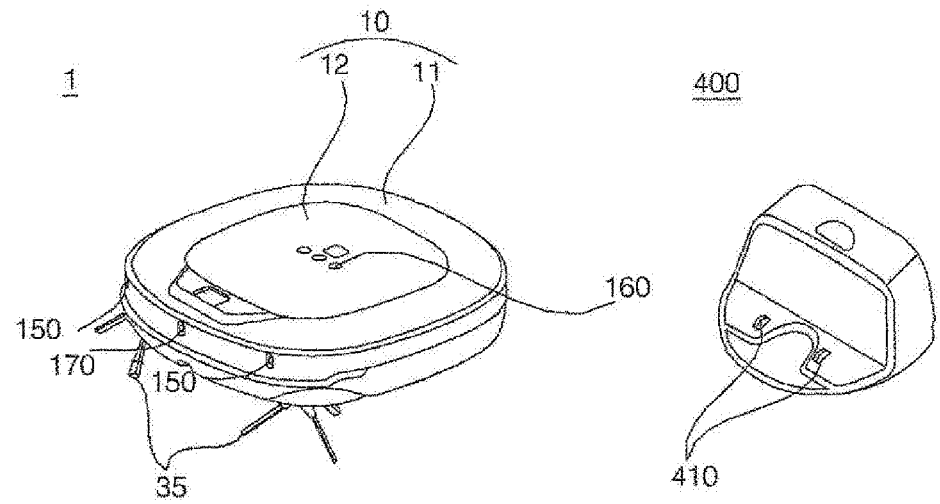
FIG. 1 is a perspective view of a mobile robot according to an exemplary embodiment of the present disclosure.
Figure 1:
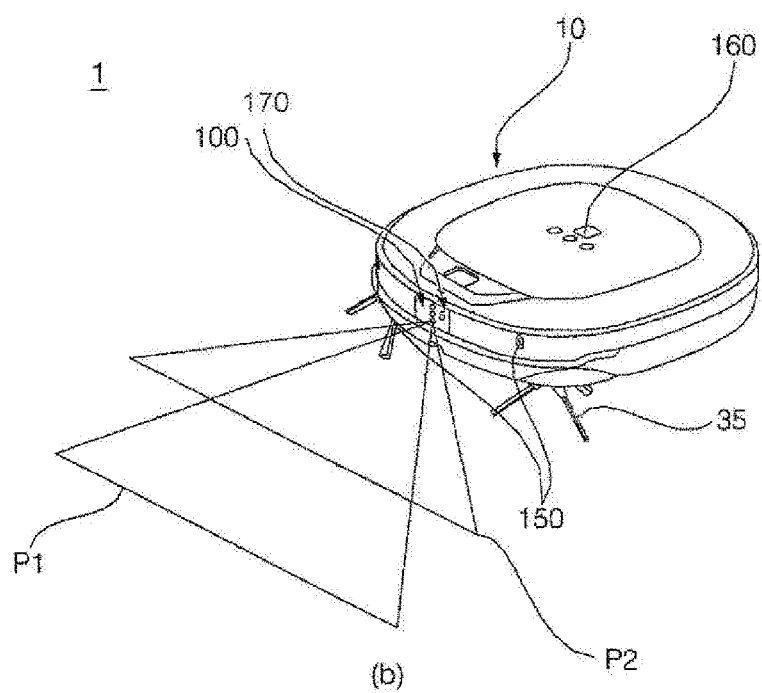

The attached drawings for illustrating exemplary embodiments of the present disclosure are referred to in order to gain a sufficient understanding of the present disclosure, the merits thereof, and the objectives accomplished by the implementation of the present disclosure. The invention may, however, be embodied in many different forms and should not be construed as being limited to the embodiments set forth herein, rather, these embodiments are provided so that this disclosure will be thorough and complete, and will fully convey the concept of the invention to one of ordinary skill in the art. Meanwhile, the terminology used herein is for the purpose of describing particular embodiments and is not intended to limit the invention. Like reference numerals in the drawings denote like elements. A control component according to the present disclosure may include at least one processor.

Figure 2:
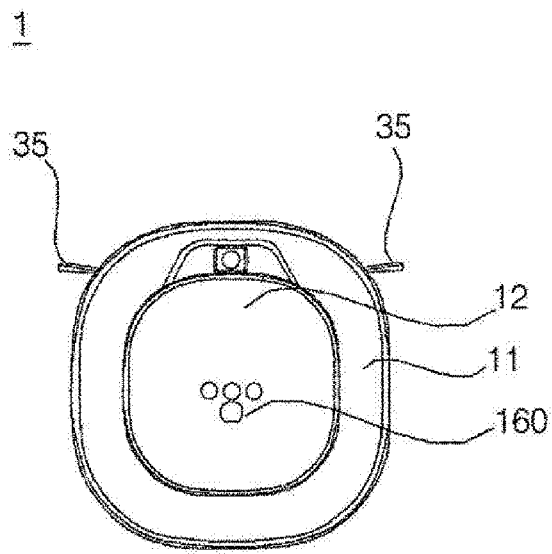
FIG. 2 is a diagram showing a horizontal viewing angle of the mobile robot of FIG. 1.
Figure 2:
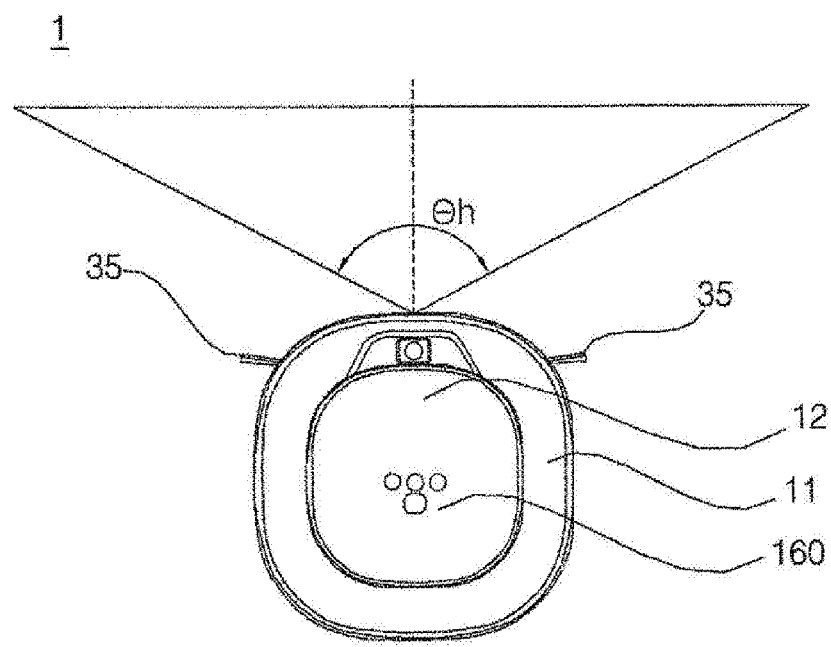
Figure 3:
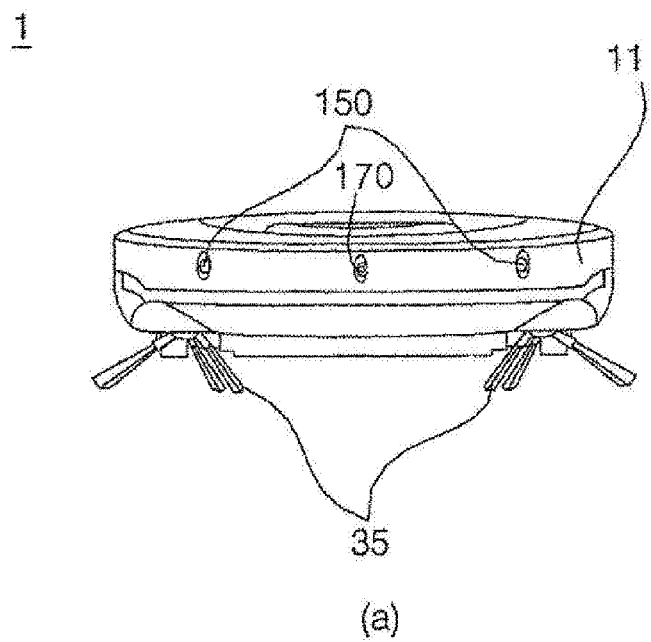
FIG. 3 is a front view of the mobile robot of FIG. 1.
Figure 3:
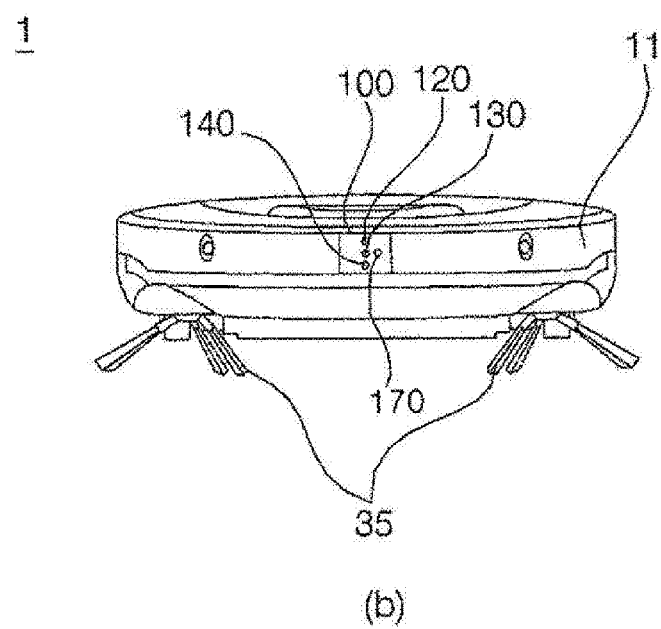
Figure 4:
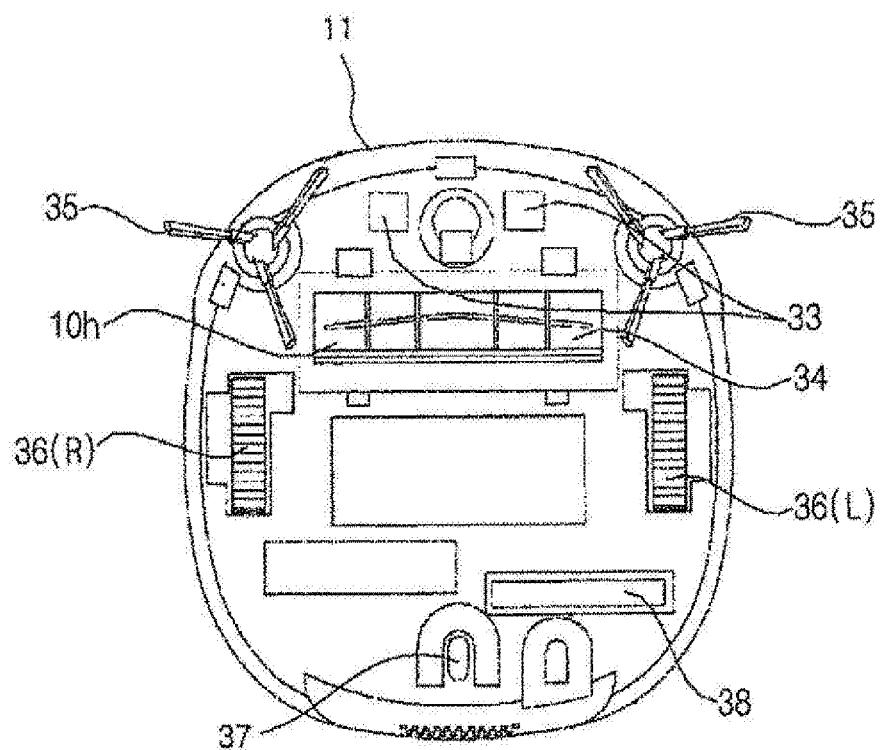
FIG. 4 is a diagram showing a bottom surface of the mobile robot of FIG. 1.

FIG. 1 is a perspective view of a mobile robot according to an exemplary embodiment of the present disclosure. FIG. 2 is a diagram showing a horizontal viewing angle of the mobile robot of FIG. 1. FIG. 3 is a front view of the mobile robot of FIG. 1. FIG. 4 is a diagram showing a bottom surface of the mobile robot of FIG. 1.

Referring to FIGS. 1 to 4, a mobile robot 1 according to an exemplary embodiment of the present disclosure may be moved along a floor of a cleaning area, and may include a body 10 for absorbing foreign substances such as dust on the floor and an obstacle detection device disposed on a front surface of the body 10.

The body 10 may include a casing 11 that forms an outer appearance and forms a space for accommodating therein components included in the body 10, an absorption unit 34 that is disposed in the casing 11 and absorbs foreign substances such as dust or waste, and a left wheel 36(L) and a right wheel 36(R) that are rotatably installed in the casing 11. As the left wheel 36(L) and the right wheel 36(R) are rotated, the body 10 may be moved along the floor of the cleaning area, and during this procedure, foreign substances may be absorbed through the absorption unit 34.

The absorption unit 34 may include an absorption fan (not shown) for generating absorption force, and an absorption inlet 10h for absorbing air current generated via rotation of an absorption fan. The absorption unit 34 may include a filter (not shown) for collecting foreign substances in the air current absorbed through the absorption inlet 10h and a foreign substances collection container (not shown) in which foreign substances collected by the filter are accumulated.

The body 10 may include a driving driver for driving the left wheel 36(L) and the right wheel 36(R). The driving driver may include at least driving motor. At least one driving motor may include a left wheel driving motor for rotation of the left wheel 36(L) and a right wheel driving motor for rotation of the right wheel 36(R).

An operation of the left wheel driving motor and the right wheel driving motor may be independently controlled by a driving controller of a controller, and thus, the body 10 may be moved forward, may be moved backward, or may turn. For example, when the body 10 is moved forward, the left wheel driving motor and the right wheel driving motor may be rotated in the same direction, but when the left wheel driving motor and the right wheel driving motor are rotated at different speeds or are rotated in different directions, a driving direction of the body 10 may be changed. The body 10 may further include at least one auxiliary wheel 37 for stably supporting the body 10.

The body 10 may further include a plurality of brushes 35 that is positioned at a front side of a bottom surface unit of the casing 11 and has brushes including a plurality of wings that radially extend. Through rotation of the plurality of brushes 35, dusts may be removed from a floor of a cleaning area, and the dusts collected from the floor may be absorbed through the absorption inlet 10h and may be collected in a collection container.

The body 10 may further include a control panel that is disposed on an upper surface of the casing 11 and receives various commands for control of the mobile robot 1 from a user.

As shown in FIG. 1A, the detection device may include a sensing unit 150 for detecting an obstacle using a plurality of sensors and an image acquirer 170 for capturing an image.

As shown in FIG. 1B, the detection device may be disposed on a front surface of the body 10 and may include an obstacle detector 100 for detecting an obstacle and the image acquirer 170 for capturing an image. The obstacle detector 100 may detect an obstacle through an image captured by emitting an optical pattern. The obstacle detector 100 may include a pattern acquirer 140 and may also include the sensing unit 150.

The image acquirer 170 may be configured to face forward and to photograph a side toward a traveling direction or, as necessary, may be configured to face a ceiling. When two image acquirers are configured, the image acquirers may be installed on a front surface and an upper end portion of the body to capture images of a front side and a ceiling, respectively.

The obstacle detector 100 may be disposed on a front surface of the body 10.

The obstacle detector 100 may be fixed to the front surface of the casing 11 and may include a first pattern emission unit 120, a second pattern emission unit 130, and the pattern acquirer 140. In this case, the pattern acquirer 140 may be disposed below the pattern emission units or may be disposed between the first and second pattern emission units as shown in the drawing.

An emission angle θh indicated in FIG. 2 may indicate a horizontal emission angle of first pattern beam P1 emitted from the first pattern emission unit 120, may indicate an angle between the first pattern emission unit 120 and opposite ends of a horizontal line, and may be determined in a range of 130° to 140°, but the present disclosure is not limited thereto. A dotted line indicated in FIG. 2 is directed toward a front side of the mobile robot 1, and the first pattern beam P1 may be configured to be symmetric with the dotted line.

The body 10 may include a rechargeable battery 38, and a charging terminal 33 of the battery 38 may be connected to a commercial power source (e.g., a power socket in the home) or the body 10 may be docked on the separate charging stand 400 connected to the commercial power source and may be connected to the commercial power source to recharge the battery 38. Electrical components included in the mobile robot 1 may receive power from the battery 38, and accordingly, when the battery 38 is recharged, the mobile robot 1 may autonomously drive in a state in which the mobile robot 1 is electrically separated from the commercial power source.

Figure 5:
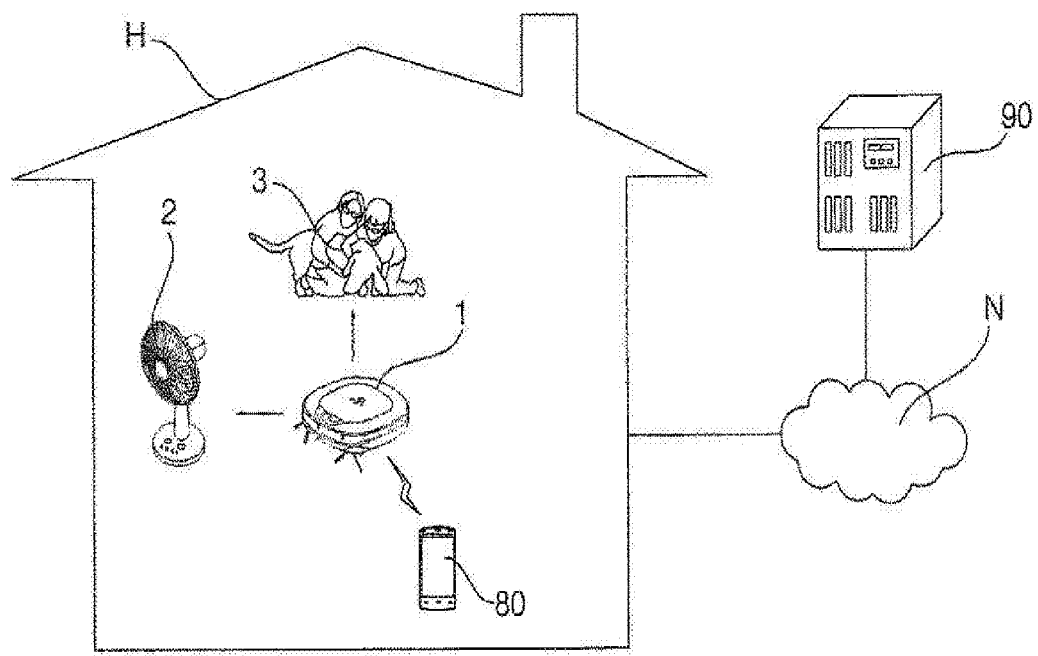
FIG. 5 is a schematic diagram of a mobile robot and a system for recognizing according to an embodiment of the present disclosure.

FIG. 5 is a schematic diagram of a mobile robot and a system for recognizing according to an embodiment of the present disclosure.

The mobile robot 1 may receive a cleaning command with respect to a predetermined cleaning region of a traveling region H and may perform cleaning. The mobile robot 1 may analyze an image captured while traveling and may determine a type of an obstacle.

The mobile robot 1 may detect a plurality of obstacles 2 and 3 present in the traveling region H to recognize an obstacle and may perform any one of approaching, passing, and avoiding operations depending on a type of the obstacle. In this case, the mobile robot 1 may avoid an obstacle rather than approaching the obstacle, may approach the obstacle at a predetermined distance and may then preform a predetermined operation, may approach the obstacle and may then avoid the obstacle, or may pass through the obstacle depending on a shape of the obstacle.

The mobile robot 1 may photograph a side toward a traveling direction through the image acquirer 170 included in the mobile robot 1 while traveling and may detect an obstacle positioned within a predetermined distance through the obstacle detector 100. The mobile robot 1 may continuously photograph a side toward a traveling direction through the image acquirer 170 or may capture an image at a predetermined interval according to setting.

The mobile robot 1 may store an image captured while traveling, and when detecting an obstacle through the obstacle detector 100, the mobile robot 1 may select performable response motions corresponding thereto, and may then determine and perform a response motion corresponding to the obstacle depending on the obstacle, in particular, depending on a type of the obstacle that is determined through image analysis.

Even if the same detection signal is input with respect to different obstacles, the mobile robot 1 may analyze an obstacle based on a captured image, may set a response motion corresponding to the obstacle, and accordingly, may perform an operation corresponding thereto.

When capturing an image, the mobile robot 1 may analyze the image at a predetermined interval and may recognize an obstacle included in the image, and when the obstacle detector 100 detects the obstacle to be positioned within a predetermined distance, the mobile robot 1 may perform an operation corresponding to the response motion based on the predetermined type of the obstacle.

For example, when the determined obstacle is a dangerous obstacle, the mobile robot 1 may avoid the obstacle rather than approaching the obstacle, and when the determined obstacle is a general obstacle, the mobile robot 1 may approach the obstacle at a close distance or may collide with the obstacle and may then avoid the obstacle.

The mobile robot 1 may determine a type of an obstacle based on data stored therein and may be connected to a server 90 or a terminal 80 and may determine the type of the obstacle. The mobile robot 1 may be connected to a separate communication device (not shown) in order to communicate with the server 90 through a network N.

The mobile robot 1 may filter each image data with respect to an image captured while traveling and may transmit the image data to a server or the terminal at a predetermined interval to make a request for obstacle information, and thus, may receive the obstacle information included in the image data from the server or the terminal. When the obstacle detector 100 determines the obstacle to be positioned within a predetermined distance, the mobile robot 1 may immediately check the obstacle through the image data.

The terminal 80 may include an application for controlling the mobile robot 1, may display a map of a traveling zone to be cleaned by the mobile robot 1 by executing the application, and may determine a specific region to make the mobile robot 1 clean the region on the map. The terminal 80 may display a position of the mobile robot based on data received from the mobile robot and may display information on a cleaning state.

The terminal may be a device that includes a communication module installed therein, is connected to a network, and has a program for controlling the mobile robot or an application for controlling the mobile robot installed therein, and may be, a computer, a laptop, a smart phone, a PDA, or a tablet PC. In addition, the terminal may also be a wearable device such as a smart watch.

The terminal 80 may be connected to the mobile robot through a network established in a home. The terminal and the mobile robot may be connected using WIFI and may also communicate with each other using a short distance wireless communication method such as Bluetooth, infrared ray communication, or Zigbee. It may be noted that a communication of the terminal and the mobile robot is not limited thereto.

The terminal 80 may determine a type of an obstacle in response to an image received from the mobile robot 1. The terminal 80 may determine the type of the obstacle based on pre-stored data or may be connected to a server to determine the type of the obstacle. For example, when it is not possible to connect the mobile robot 1 to the server via connection with a network, the terminal 80 may receive data of the mobile robot and may transmit the data to the server.

The terminal 80 may display an image on a screen, may input a type of an obstacle through user input, may transmit the input information to the mobile robot, and may determine an operation of a specific obstacle through a menu of an application.

The server 90 may analyze image data received from the mobile robot 1 connected thereto through a predetermined network N, may determine a type of an obstacle, and may transmit a response thereto to the mobile robot 1. When there is a request from the terminal, the server 90 may determine the type of the obstacle and may respond to the request.

The server 90 may accumulate image data received from the plurality of mobile robots 1, may analyze the plurality of image data, and may learn the obstacle.

The server 90 may include a database (not shown) for recognizing an obstacle based on the plurality of image data, and may recognize the feature of the obstacle, extracted from the image data, and may determine a type of the obstacle.

The server 90 may accumulate image data received from the plurality of mobile robots 1, may analyze the plurality of image data, and may learn the obstacle.

The server 90 may include a database (not shown) for recognizing an obstacle based on the plurality of image data, and may recognize the feature of the obstacle, extracted from the image data, and may determine a type of the obstacle.

The server 90 may accumulate and store obstacle information, may analyze the obstacle information, and may determine a type of the obstacle. The server 90 may classify the obstacle depending on a type thereof, and may set an operation of the mobile robot 1 with respect to the obstacle as at least one response motion.

The server 90 may analyze new obstacle information and may update pre-stored obstacle informant. The server 90 may receive and store information on an operation of the mobile robot with respect to an obstacle, which is set or changed by the terminal 80, may match the information with the pre-stored obstacle information, and may update setting of an operation of the mobile robot with respect to the obstacle.

Figure 6:
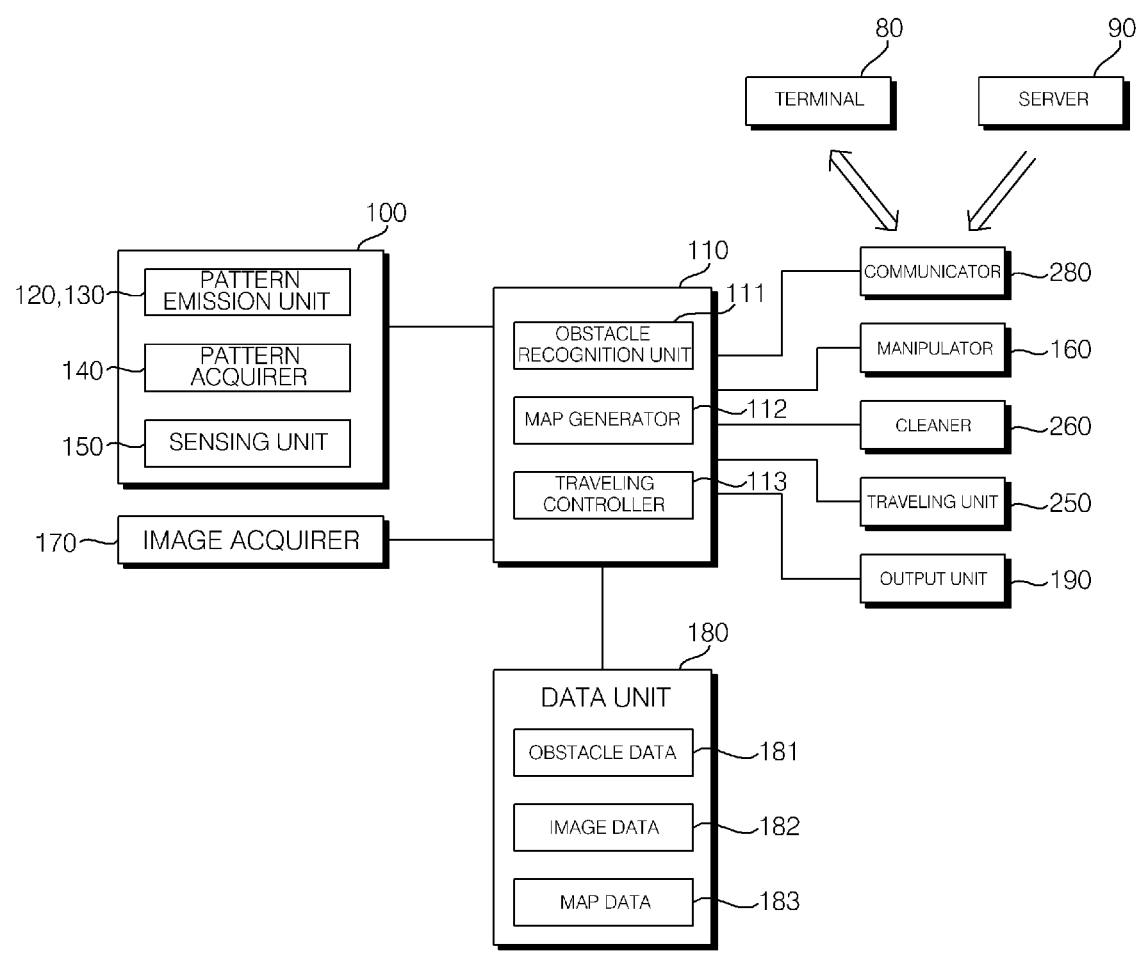
FIG. 6 is a block diagram showing main components of the mobile robot of FIG. 1.

FIG. 6 is a block diagram showing main components of the mobile robot of FIG. 1.

As shown in FIG. 6, the mobile robot 1 may include the obstacle detector 100, the image acquirer 170, a cleaner 260, a traveling unit 250, a data unit 180, an output unit 190, a manipulator 160, a communicator 280, and a controller 110 for controlling an overall operation.

The manipulator 160 may include at least one button, a switch, and a touch input device, and may receive on/off or various commands required for an overall operation of the mobile robot 1 and may input the commands to the controller 110.

The output unit 190 may include a display such as an LED or an LCD and may display an operation mode, reservation information, a battery state, an operation state, an error state, or the like. The output unit 190 may include a speaker or a buzzer and may output a predetermined sound effect, a warning horn, or voice guidance corresponding to an operation mode, reservation information, a battery state, an operation state, or an error state.

The communicator 280 may communicate with the terminal 80 using a wireless communication method. The communicator 280 may be connected to the Internet and may communicate with the external server 90 through a network in a home.

The communicator 280 may transmit a generated map to the terminal 80, may receive a cleaning command from the terminal, and may transmit data of an operation state and a cleaning state of the mobile robot to the terminal. The communicator 280 may transmit and receive data using a communication module such as WiFi or Wibro as well as short distance wireless communication such as Zigbee or Bluetooth.

The communicator 280 may transmit information on an obstacle detected from the obstacle detector 100 to the server 90 through the communicator 280 and may receive data of the obstacle from the server. The communicator 280 may receive information on an obstacle present in a traveling zone and operation information based thereon from the terminal 80 and may transmit operation data of the mobile robot to the terminal 80.

The traveling unit 250 may include at least one driving motor and may enable the mobile robot to travel according to a control command of a traveling controller 113. As described above, the traveling unit 250 may include a left wheel driving motor for rotating the left wheel 36(L) and a right wheel driving motor for rotating the right wheel 36(R).

The cleaner 260 may operate a brush to make a current state to a state in which dusts or foreign substances around the mobile robot are easily absorbed and may operate an absorption device to absorb dusts or foreign substances. The cleaner 260 may control an operation of an absorption fan included in the absorption unit 34 for absorbing a foreign substance such as dusts or wastes to inject dusts to a foreign substances collection container (dust container) through an absorption inlet.

The cleaner 260 may further include a mop cleaner (not shown) that is installed behind a bottom surface of the body to contact the floor and is configured to damp mop the floor, and a water bottle (not shown) configured to supply water to the mop cleaner.

A battery (not shown) may supply power required for an overall operation of the mobile robot 1 as well as the driving motor. When the battery is discharged, the mobile robot 1 may travel to return to a charging stand 400 for charging, and while traveling to return, the mobile robot 1 may autonomously detect a position of the charging stand. The charging stand 400 may include a signal transmitter (not shown) for transmitting a predetermined return signal. The return signal may be an ultrasonic signal or an infrared (IR) signal, but is not limited thereto.

The data unit 180 may store a detection signal input from the obstacle detector 100 or the sensing unit 150, may store reference data for determining an obstacle, and may store obstacle information on the detected obstacle.

The data unit 180 may store obstacle data 181 for determining a type of an obstacle, image data 182 for storing a captured image, and map data 183 of a region. The map data 183 may include obstacle information, and may store a basic map of a region which is searched by the mobile robot and in which the mobile robot is capable of traveling, a cleaning map formed by dividing the basic map into regions, a user map generated by organizing shapes of regions of the cleaning map to make a user check the same, and a guide map displayed by overlapping the cleaning map and the user map with each other.

The obstacle data 181 may be data for recognizing an obstacle and determining a type of the obstacle and may include information on an operation of a mobile robot with respect to the recognized obstacle, for example, motion information on a traveling speed, a traveling direction, whether a mobile robot avoids the obstacle, whether the mobile robot stops, or the like, and may include data of a sound effect, a warning horn, and voice guidance output through a speaker 173. The image data 182 may include a captured image and recognition information for obstacle recognition received from the server.

The data unit 180 may store control data for controlling an operation of the mobile robot, data of a cleaning mode of the mobile robot, and a detection signal of ultrasonic wave/laser or the like of the sensing unit 150.

The data unit 180 may store data to be read by a microprocessor and may include a hard disk drive (HDD), a solid state disk (SSD), a silicon disk drive (SDD), ROM, RAM, CD-ROM, a magnetic tape, a floppy disk, or an optical data storage device.

The obstacle detector 100 may include the first pattern emission unit 120, the second pattern emission unit 130, and the pattern acquirer 140. As described above with reference to FIG. 1A, when the pattern emission unit is not included, an obstacle may be detected from an image captured by an image acquirer without an emitted pattern.

The obstacle detector 100 may include a plurality of image acquirers. When the obstacle detector 100 includes a pattern emission unit, the obstacle detector 100 may further include an image acquirer for capturing an image including a pattern and a separate image acquirer for photographing a side in a traveling direction or a forward upper side.

The obstacle detector 100 may include the first pattern emission unit 120, the second pattern emission unit 130, and the pattern acquirer 140. The obstacle detector 100 may include the sensing unit 150 included in at least one sensor. As necessary, the obstacle detector 100 may include a sensor.

As described above, the obstacle detector 100 may be installed on a front surface of the body 10, may emit the first and second pattern beam P1 and P2 to a front side of the mobile robot, and may photograph emitted pattern beam to acquire an image including the pattern. The obstacle detector 100 may input the acquired image to the controller 110 as the obstacle detection signal.

The first and second pattern emission units 120 and 130 of the obstacle detector 100 may include a light source and an optical pattern projection element (OPPE) for generating a predetermined pattern by projecting light emitted from the light source. The light source may be a laser diode (LD), a light emitting diode (LED), or the like. The LD may be capable of precisely measuring a distance due to excellent monochromaticity, straight characteristics, and interface characteristics compared with other light sources, and in particular, infrared rays or visible rays have a problem in that a large deviation occurs in accuracy in measuring a distance for the reason such as color or material of a target object, and thus, the LD may be used as a light source. An optical pattern projection element (OPPE) may include a lens or a diffractive optical element (DOE). Beams with various patterns may be emitted depending on a configuration of an OPPE included in each of the pattern emission units 120 and 130.

The pattern acquirer 140 may acquire an image of a front side of the body 10. In particular, the pattern beams P1 and P2 may be indicated in an image (hereinafter, an acquired image) acquired by the pattern acquirer 140, and hereinafter, an image of the pattern beams P1 and P2 indicated on the acquired image may be referred to as a light pattern, and the light pattern is an image formed by focusing the pattern beams P1 and P2 that is substantially incident on an actual space on an image sensor, and thus, reference numerals such as the pattern beams P1 and P2 are denoted, and images corresponding to the first pattern beam P1 and the second light pattern P2, respectively, may be referred to as the first light pattern P1 and the second light pattern P2, respectively.

When the pattern emission unit is not included, the pattern acquirer 140 may acquire an image of a front side of the body, which does not include a pattern beam.

The pattern acquirer 140 may include a camera for converting an image of a subject into an electric signal, re-changing the electric signal to a digital signal, and then recording the digital signal in a memory device. The camera may include an image sensor (e.g., a CMOS image sensor) including at least one optical lens and a plurality of didoes (photodiodes, e.g., pixels) for forming an image by light passing through the optical lens, and a digital signal processor (DSP) for configuring an image based on a signal output from the photodiodes. The DSP may generate a video image including frames including a still image as well as a still image.

The image sensor may be a device for converting an optical image into an electric signal and may include a chip having a plurality of optical diodes integrated thereon, and the optical diode may be, for example, a pixel. Electric charges may be accumulated on each pixel according to an image formed on a chip by light passing through the lens, and the electric charges accumulated on the pixel may be converted into an electric signal (e.g., a voltage). A charge coupled device (CCD), a complementary metal oxide semiconductor (CMOS), or the like has been well known as an image sensor.

An image processor may generate a digital image based on an analog signal output from an image sensor. The image processor may include an AD converter for converting an analog signal into a digital signal, a buffer memory for temporally recording digital data according to the digital signal output from the AD converter, and a digital signal processor (DSP) for processing the information recorded in the buffer memory to configure a digital image.

The obstacle detector 100 may analyze a pattern through the acquired image and may detect an obstacle depending on a shape of the pattern, and the sensing unit 150 may detect an obstacle positioned at a detection distance of each sensor through a sensor.

The sensing unit 150 may include a plurality of sensors to detect an obstacle. The sensing unit 150 may detect a front side of the body 10, that is, an obstacle in a traveling direction using at least one of a laser beam, an ultrasonic wave, or infrared rays. The sensing unit 150 may further include a cliff detection sensor for detecting whether a cliff is present on the floor in a traveling zone. When a transmitted signal is reflected and input to the sensing unit 150, the sensing unit 150 may input information on whether an obstacle is present or information on a distance to the obstacle to the controller 110 as an obstacle detection signal.

When the mobile robot is operated, the image acquirer 170 may capture continuous images. The image acquirer 170 may capture an image with a predetermined period. The image acquirer 170 may capture an image even in a traveling or cleaning state in which an obstacle is not detected by the obstacle detector 100.

For example, after the image acquirer 170 performs photography once, when the mobile robot is moved in a traveling direction, the size of a photographed obstacle is just changed in an image captured once while the traveling direction is maintained rather than being changed, and thus, the image may be periodically captured. The image acquirer 170 may capture an image in units of predetermined time or predetermined distance. The image acquirer 170 may capture a new image while the traveling direction is changed.

The image acquirer 170 may set a photography period depending on a moving speed of the mobile robot. The image acquirer 170 may set the photography period in consideration of a detection distance of the sensor unit and the moving speed of the mobile robot.

The image acquirer 170 may store an image captured while the body travels in the data unit 180 as the image data 182.

The obstacle detector 100 may detect an obstacle positioned in a path in a traveling direction and may input to the detection signal to a controller. The obstacle detector 100 may input information on a position of the detected obstacle or information on movement thereof to the controller 110. The pattern acquirer 140 may include an image including the pattern emitted by the pattern emission unit to the controller as a detection signal, and the sensing unit 150 may input a detection signal of an obstacle detected by a sensor to the controller.

The controller 110 may control the traveling unit 250 to allow the mobile robot to travel in a traveling zone determined in the traveling region H.

While traveling, the controller 110 may control the traveling unit 250 and the cleaner 260 to absorb dusts or foreign substances around the mobile robot, and thus, may perform cleaning in the traveling zone. Thus, the cleaner 260 may operate a brush to make a current state to a state in which dusts or foreign substances around the mobile robot are easily absorbed and may operate an absorption device to absorb dusts or foreign substances. The controller 110 may control the cleaner to absorb foreign substance and to perform cleaning while traveling.

The controller 110 may check charge capacity of a battery and may determine a time of returning to a charging stand. When the charging capacity is reached to a predetermined value, the controller 110 may stop a performed operation, and may start searching for the charging stand in order to return to the charging stand. The controller 110 may output notification of the charge capacity of the battery and notification of return to the charging stand.

The controller 110 may set an operation mode of the mobile robot by processing input data according to manipulation of the manipulator 160, may output an operation state through the output unit 190, and may output a warning horn, sound effect, or voice guidance based on detection of an operation state, an error state, or an obstacle through a speaker.

The controller 110 may recognize an obstacle detected by the image acquirer 170 or the obstacle detector 100 and may set and perform any one of a plurality of response motions, which corresponds to the obstacle.

The controller 110 may determine the obstacle from an image captured by the image acquirer 170, and when the obstacle detector 100 detects the obstacle to be positioned within a predetermined distance, the controller may set and operate the response motion with respect to the obstacle.

Before the obstacle detector 100 detects the obstacle, the controller 110 may analyze an image captured through the image acquirer 170, i.e., image data and may determine an obstacle included in the image data. The controller 110 may determine an obstacle through data contained therein, may also transmit image data to a server or a terminal through a communicator and may determine a type of the obstacle.

When the obstacle detector 100 detects the obstacle to be positioned within a predetermined distance after an image is captured, if a sensor unit for setting a response motion depending on a type of a corresponding obstacle detects the corresponding obstacle based on a detection signal, the controller 110 may make the body perform a determined operation depending on a type of pre-recognized obstacle.

The controller 110 may perform an operation corresponding to an obstacle when the obstacle is detected depending on a detection distance of an obstacle detection unit, and even if the obstacle is detected by the obstacle detection unit, when the obstacle is positioned within a predetermined distance, an operation corresponding to the obstacle may be performed.

For example, when a distance at which an obstacle is initially detected from a detection signal by a pattern acquirer and a distance at which the obstacle is detected by an ultrasonic sensor, a time of inputting a detection signal with respect to an obstacle may be changed. Thus, when there is a plurality of elements for detecting an obstacle or a distance for detecting an obstacle is equal to or greater than a predetermined distance like in a laser sensor, the controller 110 may perform any one of a plurality of response motions based on a distance to an obstacle detected by the obstacle detector 100 when the obstacle is positioned at a predetermined distance, for example, 30 cm.

The controller 110 may determine performable response motions among a plurality of response motions depending on a shape of a detection signal based on a detection signal with respect to an obstacle, may analyze image data to recognize an obstacle included in the image, and accordingly, may select any one of the response motion to control an operation of the body.

For example, when the detection signal corresponds to an image included in a pattern, the controller may determine an obstacle based on different detection signals depending on a shape of a pattern and may identify the obstacle according to a detection signal, that is, the shape of the pattern.

When recognizing an obstacle through an image, the controller 110 may determine the obstacle with respect to the captured with a predetermined period before the obstacle detection unit inputs a detection signal or at a time when an obstacle detection signal is input. As necessary, the controller 110 may transmit data to the server 90 or the terminal 80 and may receive data on an obstacle.

For example, when the controller 110 inputs the same detection signal with respect to different obstacles, thresholds, fans, or tables, the controller 110 may select a plurality of performable response motions with respect to the corresponding detection signal, set respective response motions with respect to thresholds, fans, or tables and may control an operation through image data.

The controller 110 may include an obstacle recognition unit 111, a map generator 112, and the traveling controller 113.

When an initial operation is performed or a map of a cleaning region is not stored, the map generator 112 may generate a map of a cleaning region based on obstacle information while the mobile robot travels in the cleaning region. The map generator 112 may generate a pre-generated map based on the obstacle information acquired while traveling.

The map generator 112 may generate a basic map based on information acquired from the obstacle recognition unit 111 while traveling and may generate a cleaning map by dividing the basic map into regions. The map generator 112 may generate the user map and the guide map by organizing regions of the cleaning maps and setting the attributes of the region. The basic map may be a map that indicates a shape of a cleaning region acquired through traveling using an outline thereof and the cleaning map may be a map formed by dividing the basic map into regions. The basic map and the cleaning map may information on a region in which the mobile robot is capable of traveling and obstacle information. The user map may be a map formed by simplifying regions of the cleaning map, organizing and processing shapes of outlines of the regions, and adding a visual effect. The guide map may be a map obtained by overlapping the cleaning map and the user map with each other. The guide map indicates the cleaning map, and thus, a cleaning command may be input based on a region in which the mobile robot actually travels.

After generating the basic map, the map generator 112 may generate a map by dividing a cleaning region into a plurality of regions, adding a connection path for connecting the plurality of regions to the map, and adding information on an obstacle in each region to the map. The map generator 112 may generate a map in which regions are separated by dividing the region on the map into sub-regions to set a representative region, setting the divided sub-regions as separate detailed regions, and merging the detailed regions to the representative region.

The map generator 112 may process shapes of regions with respect to the separated regions. The map generator 112 may set the attributes of the separated regions, and may process the shapes of the regions depending on the attributes of the regions.

The obstacle recognition unit 111 may determine an obstacle through input from the image acquirer 170 or the obstacle detector 100, and the map generator 112 may generate a map of a traveling zone and may add information on the detected obstacle to the map. The traveling controller 113 may control the traveling unit 250 to change a moving direction or a traveling path in response to the obstacle information or to travel to pass through the obstacle or avoid the obstacle.

The traveling controller 113 may control the traveling unit 250 to independently operate a left wheel driving motor and a right wheel driving motor, and thus, the body 10 may travel to go straight or to turn. The traveling controller 113 may control the traveling unit 250 and the cleaner 260 depending on a cleaning command and may absorb a foreign substance to perform cleaning while the body 10 travels in the cleaning region.

The obstacle recognition unit 111 may analyze data input from the obstacle detector 100 and may determine an obstacle. The obstacle recognition unit 111 may calculate a distance of the obstacle or a distance to the obstacle according to a detection signal of the obstacle detection unit, for example, a signal of an ultrasonic wave or a laser beam, may analyze an acquired image including a pattern to extract the pattern, and may determine the obstacle. When an ultrasonic wave or infrared ray signal is used, a shape of a received ultrasonic wave and a time of receiving the ultrasonic wave are changed depending on a distance of the obstacle or a position of the obstacle, the obstacle recognition unit 111 may determine an obstacle based thereon.

When the image acquirer 170 inputs image data obtained by photographing an obstacle, the obstacle recognition unit 111 may store the image data in the data unit 180. The image acquirer 170 may photograph a front obstacle a plurality of number of times, and thus, a plurality of image data may also be stored. When the image acquirer 170 continuously captures an image in a traveling direction, the obstacle recognition unit 111 may store an input video image as image data or may divide the video image in frame units and may store the video image as image data.

The obstacle recognition unit 111 may analyze a video image in frame units, may remove an unnecessary frame, that is, a frame in which a target object shakes, an unfocused frame, or an empty frame (a frame in which an obstacle is not photographed), and may store a frame as image data in predetermined time units.

The obstacle recognition unit 111 may analyze a plurality of image data and may determine whether a photographed target object, that is, an obstacle is recognized. In this case, the obstacle recognition unit 111 may analyze image data and may determine whether image data is recognizable. For example, the obstacle recognition unit 111 may separate and discard a shaking image, an unfocused image, or an image in which an obstacle is identified due to darkness.

The obstacle recognition unit 111 may analyze image data to extract the feature of the obstacle and may determine based on the shape, size, and color of an obstacle to determine a position of the obstacle.

The obstacle recognition unit 111 may analyze an obstacle from a plurality of pre-captured images, and may analyze an image captured prior to a predetermined time based on a time of determining the obstacle to be positioned at a predetermined distance to determine the obstacle upon receiving a detection signal of the obstacle.

Only a portion of an obstacle is photographed in a state in which the mobile robot approaches the obstacle within a predetermined distance, and thus, the obstacle may be determined using an image captured by photographing an entire shape of the obstacle because the obstacle is photographed prior to a predetermined time, that is, the obstacle is photographed at a farther distance than a predetermined distance. The obstacle recognition unit 111 may determine a detailed type of the obstacle and, as necessary, may determine only the shape and size of the obstacle.

The obstacle recognition unit 111 may exclude a background of an image from image data, may extract the feature of the obstacle based on pre-stored obstacle data, and may determine a type of the obstacle. The obstacle data 181 may be updated based on new obstacle data received from a server. The mobile robot 1 may store obstacle data of the detected obstacle and may receive data of the type of the obstacle from a server with respect to other data.

The obstacle recognition unit 111 may detect feature such as a point, a line, or a surface from predetermined pixels included in an image and may detect an obstacle based on the detected feature.

The obstacle recognition unit 111 may extract an outline of an obstacle, may recognize the obstacle based on a shape thereof, and may determine a type of the obstacle. The obstacle recognition unit 111 may determine the type of the obstacle depending on the color or size of the obstacle based on the shape. The obstacle recognition unit 111 may determine the type of the obstacle based on the shape and movement of the obstacle.

The obstacle recognition unit 111 may differentiate the human, an animal, and an object therebetween based on obstacle information. The obstacle recognition unit 111 may classify a type of the obstacle into a general obstacle, a dangerous obstacle, a bio obstacle, and a floor obstacle and may determine a detailed type of the obstacle with respect to each classification.

The obstacle recognition unit 111 may transmit recognizable image data to the server 90 through the communicator 280 and may determine a type of the obstacle. The communicator 280 may transmit at least one image data to the server 90.

When receiving image data from the mobile robot 1, the server 90 may analyze image data to extract an outline or shape of the photographed object, and may compare the extracted information with pre-stored data of the object, and may determine a type of the obstacle. The server 90 may preferentially search for obstacles with a similar shape or a similar color, may extract feature from corresponding image data, and may compare the information, and thus, may determine a type of the obstacle.

The server 90 may determine a type of an obstacle and may then transmit data of the obstacle to the mobile robot 1.

The obstacle recognition unit 111 may store data of an obstacle, received from a server through a communicator, in the data unit 180 as obstacle data. When the server determines the type of the obstacle, the obstacle recognition unit 111 may perform an operation corresponding thereto. The traveling controller 113 may control the traveling unit to avoid, approach, or pass through the obstacle in response to a type of the obstacle, and as necessary, may output a predetermined sound effect or a warning horn, or voice guidance through a speaker.

As described above, the obstacle recognition unit 111 may determine whether image data is recognizable and may transmit image data to the server according to stored obstacle data, and thus, may recognize a type of the obstacle according to response of the server.

The obstacle recognition unit may store obstacle data for obstacle recognition with respect to a selected obstacle among a plurality of obstacles, and thus, even if image data is not transmitted to the server, the obstacle recognition unit may recognize the obstacle based on obstacle recognition data.

There is a limit in a storage capacity of the data unit 180, and thus, the controller 110 may store information on a portion of the selected obstacle as obstacle recognition data. For example, the controller 110 may store obstacle recognition data in a data unit with respect to an obstacle selected through the terminal 80 or an obstacle that is detected large numbers of times based on a detection number of times.

Thus, the obstacle recognition unit 111 may information on an obstacle present in a cleaning region or a repeatedly detected obstacle in the data unit, and thus, when an obstacle is detected, an operation corresponding thereto may be immediately performed.

When recognizing a type of an obstacle from image data, the traveling controller 113 may control the traveling unit 250 to allow the body 10 to perform a predetermined operation in response to the type of the obstacle.

When determining the obstacle to be positioned within a predetermined distance according to a detection signal of the obstacle detector 100, the traveling controller 113 may set and perform any one of a plurality of response motions depending on a type, shape, or size of the obstacle, determined based on image data, with respect to a response motion to be executed depending on the type or shape of the detection signal.

The traveling controller 113 may determine whether the mobile robot is capable of traveling or entering, may set a traveling path/cleaning path to allow the mobile robot to approach the obstacle, to pass through the obstacle, or to avoid the obstacle, and may control the traveling unit 250 in response to the obstacle recognized by the obstacle recognition unit 111.

For example, the traveling controller 113 may stop, decelerate, accelerate, reverse, U-turn, and change a traveling direction in response to the obstacle, may prevent the body 10 from approach the obstacle at a predetermined distance or greater, and may make the body 10 to stand by for a predetermined time. The traveling controller 113 may output sound determined depending on an obstacle through a speaker and may output the sound with a predetermined operation.

When the obstacle detector 100 detects an obstacle to be positioned within a predetermined distance, the traveling controller 113 may set a plurality of response motions such as avoidance, approaching, setting of an approaching distance, stoppage, deceleration, acceleration, reverse, U-turn, and a change in traveling direction depending on a detection signal, and may set any one response motion depending on an obstacle determined from captured image data, may control the traveling unit.

That is, the traveling controller 113 may set a plurality of response motions depending on an input detection signal, and in this case, may control the traveling unit to perform any one of a plurality of response motions in response to an obstacle determined from pre-captured image data prior to a time of inputting a detection signal.

When a detailed type of the obstacle is determined through image data, the traveling controller 113 may set a response motion depending on the type of the obstacle, and even if it is not possible to accurately determine the type of the obstacle, the traveling controller 113 may set a response motion depending on the shape or size of the obstacle. For example, when the detailed type of the obstacle is not known but a space with a predetermined size from a floor surface, that is, a space with a height and a width for enabling the mobile robot to pass therethrough is present, the traveling controller 113 may set the response motion to the body to pass through the obstacle.

Hereinafter, a mobile robot according to a second embodiment will be described.

The mobile robot according to the second embodiment may be configured as shown in FIGS. 1 to 6 showing a first embodiment. The mobile robot according to the second embodiment may be configured with the same hardware as in the first embodiment, and a control component based thereon is shown in FIG. 6.

As described above with reference to FIG. 6, the mobile robot 1 according to the second embodiment may include the obstacle detector 100, the image acquirer 170, the cleaner 260, the traveling unit 250, the data unit 180, the output unit 190, the manipulator 160, the communicator 280, and the controller 110 for controlling an overall operation. The controller 110 may include the obstacle recognition unit 111, the map generator 112, and the traveling controller 113.

Thus, with regard to the mobile robot according to the second embodiment, the same term and the same reference numeral are denoted for the same component as in the first embodiment. The mobile robot according to the second embodiment may comply with the description of the first embodiment with respect to the same components as in the first embodiment, and a description thereof will be omitted below.

The mobile robot according to the second embodiment may capture a plurality of images while traveling, and in this case, may periodically capture and store an image, may pre-detect an obstacle through the corresponding image, and may then perform a predetermined operation when a distance from the obstacle becomes a predetermined distance.

When image data obtained by photographing a side toward a traveling direction is stored, the obstacle recognition unit 111 may determine an obstacle through the stored image data. Even if a separate obstacle detection signal is not input from the obstacle detection unit, the obstacle recognition unit 111 may analyze image data and may recognize an obstacle included in the image data.

When the obstacle recognition unit 11 determines an obstacle from image data and then the obstacle is positioned within a predetermined distance according to a detection signal of the obstacle detector 100, the traveling controller may set a response motion in response to the obstacle and thus may perform a response motion.

That is, according to the first and second embodiments, after an obstacle is detected, an image may be analyzed and whether the obstacle is recognized or whether the obstacle is pre-recognized from an image may be determined, and in this regard, the obstacle may be detected from the obstacle, and a response motion may be set and performed depending on a type of the obstacle.

The traveling controller 113 may determine a dangerous situation with respect to various cases that occur while traveling, may transmit, to the server, image data that is pre-captured based on a time point at which the dangerous situation occurs, and may make a request for obstacle information in order to prevent or prepare for the dangerous situation.

For example, when a confinement situation occurs due to a predetermined obstacle after the mobile robot enters the obstacle, the traveling controller 113 may transmit, to the server, an image captured for a predetermined time prior to a time point of determining a confinement situation or at least one piece of image data captured while the mobile robot travels. When a traveling distance for a predetermined time is less than a predetermined distance, the traveling controller 113 may determine a current situation to be a confinement situation.

The confinement situation may refer to a state in which movement of the body is confined and is limited because it is not possible to move the body for a predetermined distance or greater due to an obstacle.

While traveling, when a dangerous situation occurs, for example, a specific object falls on or ahead of the body, the traveling controller 113 may transmit image data captured before the dangerous situation occurs, to the server. For example, a vase or the like may fall due to collision with an obstacle while traveling.

The traveling controller 113 may output error and, as necessary, may output a predetermined warning horn or voice guidance.

When a dangerous situation occurs, the traveling controller 113 may receive obstacle information generated based on the image data transmitted to the server, may update the obstacle information of a data unit, may determine the corresponding obstacle to be an obstacle as the reason for a dangerous situation, and may then may enable the mobile robot to travel and avoid the obstacle.

The server 90 may analyze a plurality of pieces of received image data with respect to a predetermined time or a predetermined distance, may determine an obstacle as the reason for the dangerous situation, may generate a recognition model for the corresponding obstacle, may set a response motion not to approach or enter the obstacle, may update obstacle information with respect to the set response motion, and may transmit the updated obstacle information to the mobile robot 1.

The server 90 may determine an obstacle as the reason for a confinement situation, may set obstacle information including the feature of a corresponding obstacle and a response motion for the feature to enable the mobile robot to avoid the corresponding obstacle without entering the obstacle, and may transmit the obstacle information to the mobile robot. When a vase falls in the case of collision with an obstacle, the server 90 may analyze an image, may determine an obstacle put on the vase, may set a response motion to prevent the mobile robot from approaching the corresponding obstacle, and may generate obstacle information.

The traveling controller 113 may enable the mobile robot to travel and avoid the corresponding obstacle according to a response motion with respect to a confinement situation received from the server. When a confinement situation occurs in a detected obstacle, the traveling controller 113 may control the traveling unit to approach and then avoid the corresponding obstacle at a predetermined distance or to change a traveling direction and avoid the obstacle immediately after detecting the obstacle.

Figure 7:
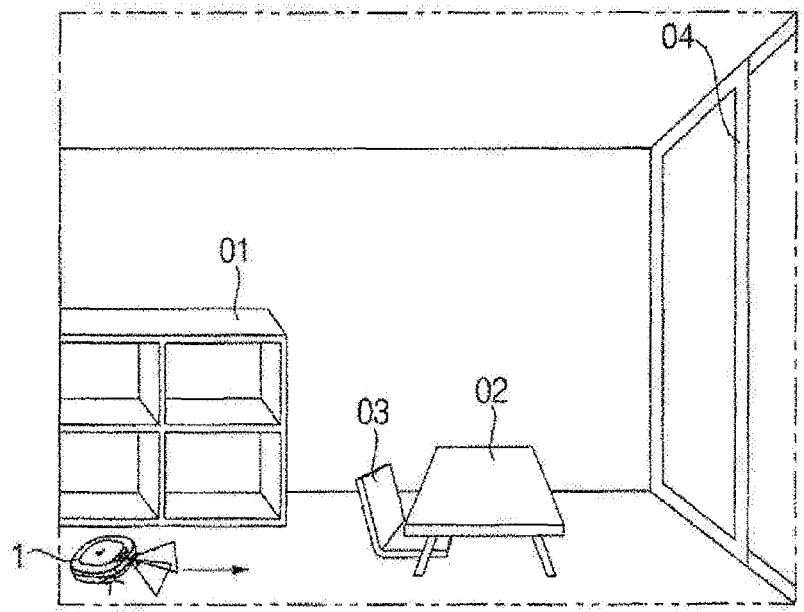
FIGS. 7 and 8 are diagrams showing an example of driving of a mobile robot and an image captured while traveling according to the present disclosure.
Figure 7:
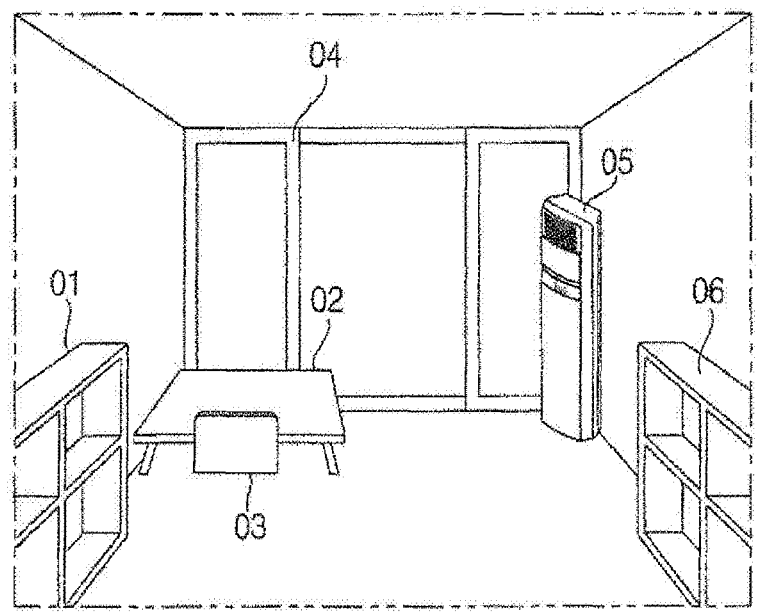
Figure 8:
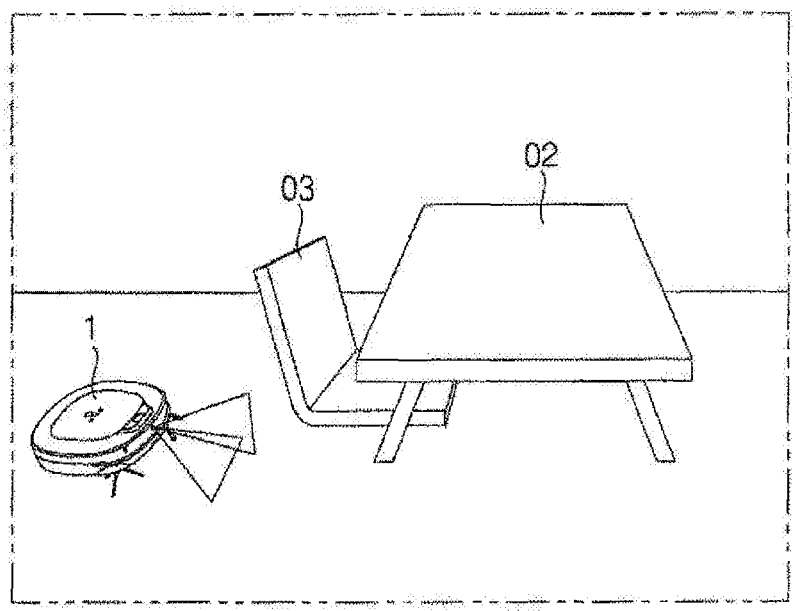
Figure 8:
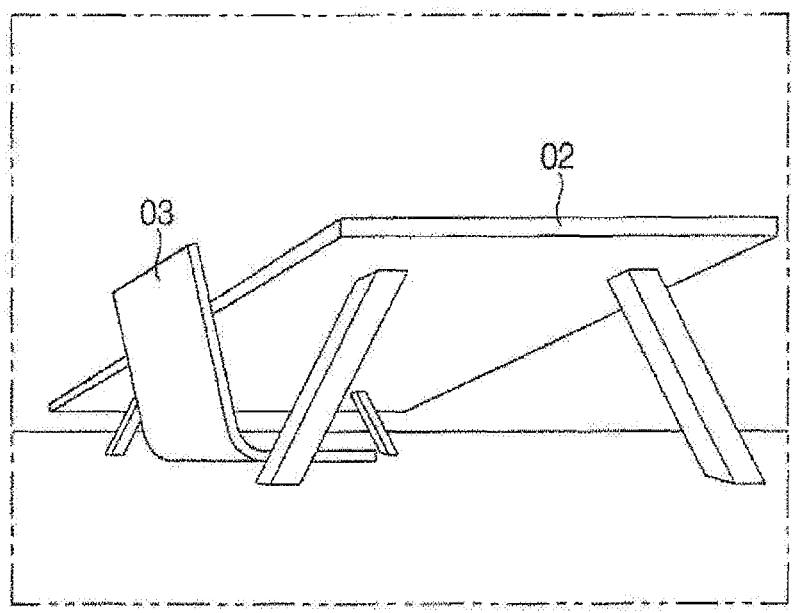

FIGS. 7 and 8 are diagrams showing an example of driving of a mobile robot and an image captured while traveling according to the present disclosure.

As shown in FIG. 7, while traveling, the mobile robot 1 may detect an obstacle positioned ahead of the body 10.

When the mobile robot 1 travels toward a window 04 in the traveling region H as shown in FIG. 7A, an image shown in FIG. 7B may be captured. The captured image may include a plurality of obstacles O01 to O06 positioned at a side toward a traveling direction.

The image acquirer 170 may be continuously captured or may be repeatedly captured with a predetermined period.

When the mobile robot 1 travels straight, as the mobile robot approaches an obstacle, the obstacle may be photographed in an enlarged form as shown in FIG. 8.

In the captured image, as the body of the mobile robot 1 travels, an area of an obstacle positioned at a side toward a traveling direction of the mobile robot may be increased, and an area of an obstacle positioned at an opposite side to the traveling direction of the mobile robot may be reduced.

As shown in FIG. 8A, as the mobile robot travels, the mobile robot may approach second and third obstacles O02 and O03 among the plurality of obstacles O01 to O06 positioned in a region. Thus, the image captured through the image acquirer 170 may include an image formed by photographing the second and third obstacles O02 and O03 as shown in FIG. 8B.

The obstacle recognition unit 111 may store an image captured at the same positioned as in FIG. 7 and may detect and recognize the plurality of obstacles O01 to O06 through the stored image data. As shown in FIG. 8, when the mobile robot 1 approaches the second and third obstacles O02 and O03, the obstacle detector 100 may input a detection signal, and the obstacle recognition unit 111 may determine the obstacle to be positioned within a predetermined distance and may determine the obstacle based on pre-captured image data. The obstacle recognition unit 111 may determine the obstacle before the detection signal is input, may transmit the image data to the server or the terminal, and may determine the obstacle.

When a traveling direction of the mobile robot 1 is changed, if the obstacle is determined according to the detection signal, the possibility that image data captured before the traveling direction is changed does not include an obstacle at a side toward the traveling direction is high, and thus, the obstacle may be determined based on an image after the traveling direction is changed. Thus, when the obstacle is positioned within a predetermined distance according to the detection signal of the obstacle detector 100, the mobile robot 1 may determine the obstacle based on image data pre-captured in the same traveling direction.

The mobile robot 1 may recognize an obstacle from the captured image data and may determine a type of the obstacle. The image acquirer 170 may store image data captured while traveling, and the controller may analyze image with a predetermined period, and in this case, when the obstacle detector 100 determines the obstacle or the obstacle to be positioned within a predetermined distance, the controller may determine the obstacle using pre-captured image data.

The controller may determine information on the type, shape, and size of the obstacle through image data with respect to the second and third obstacles O02 and O03 as described above, and thus, may control the traveling unit to perform a response motion in response thereto.

For example, when receiving a detection signal of the second obstacle with respect to the second obstacle O02 that is a table, the controller 110 may select two response motions such as avoidance and entrance after approach, may analyze image data, and may determine and operate any one of response motions according to whether the mobile robot enters a space below the table.

Even if tables have the same type, the tables have different sizes, the space below the table have different sizes of, and the mobile robot have different sizes, and accordingly, whether the mobile robot enters the space below the table may be changed, and thus, the controller may set a plurality of performable response motions, for example, avoidance, entrance, or pass after approach based on a detection signal of the obstacle detector 100, and may determine to select and perform any one of the plurality of response motions depending on the type, shape, and size of the obstacle through image analysis.

Whether the mobile robot enters a space below a table may be determined depending on the height of the table and the width of a table leg and a traveling direction may be determined. With respect to the same table, that is, the second obstacle O02, a response motion may be changed depending on whether a chair such as the third obstacle O03 is present.

Thus, the mobile robot may set a plurality of response motions of processing a detection signal with respect to an obstacle when the detection signal is input, and may set any one response motion based on obstacle information determined through an image, and thus, may perform different response motions depending on the size or shape of the obstacle or the size of the body of the mobile robot with respect to the table.

Figure 9:
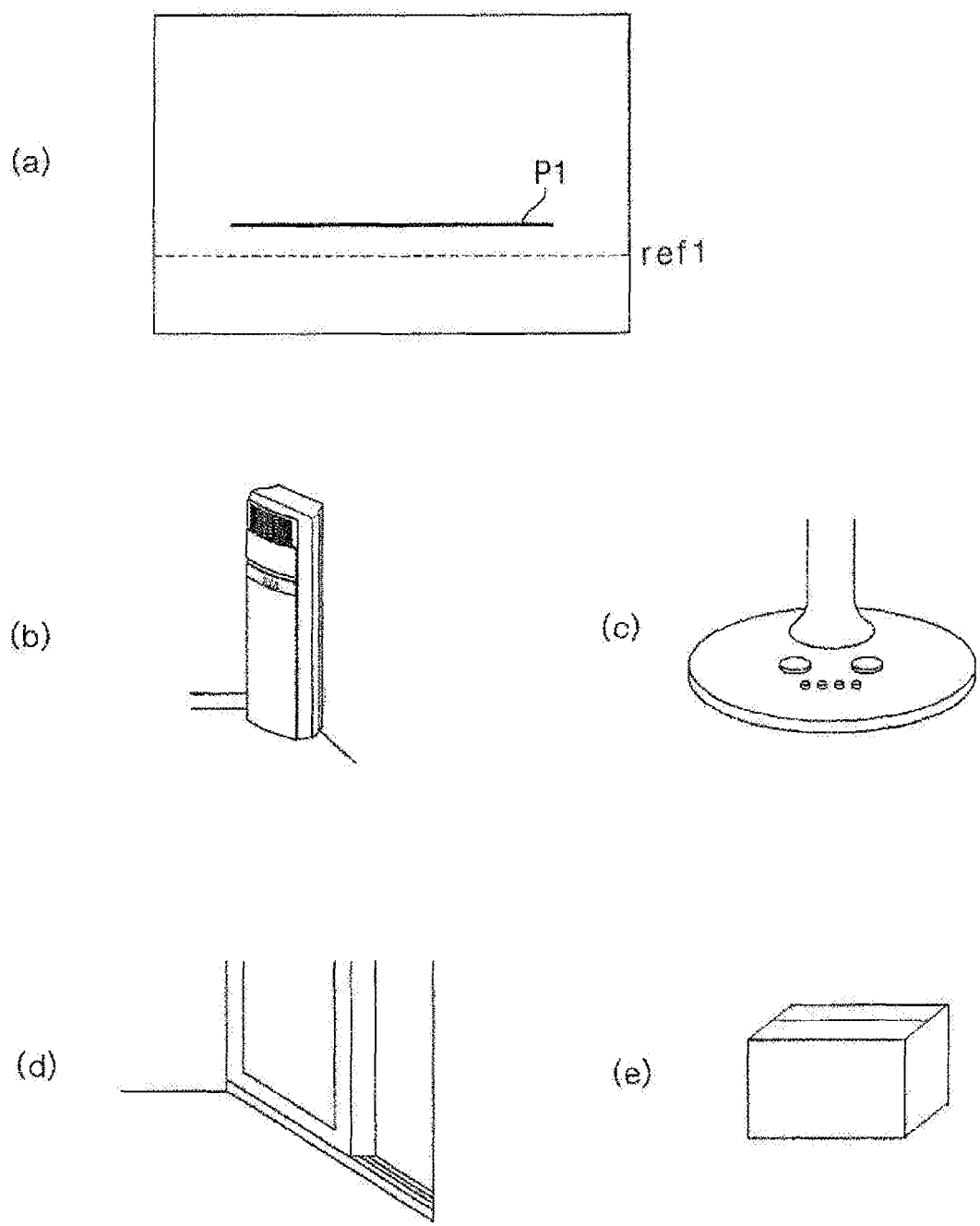
FIG. 9 is a diagram for explaining recognition of a detection signal of an obstacle and recognition of the obstacle in a mobile robot according to an embodiment of the present disclosure.
Figure 10:
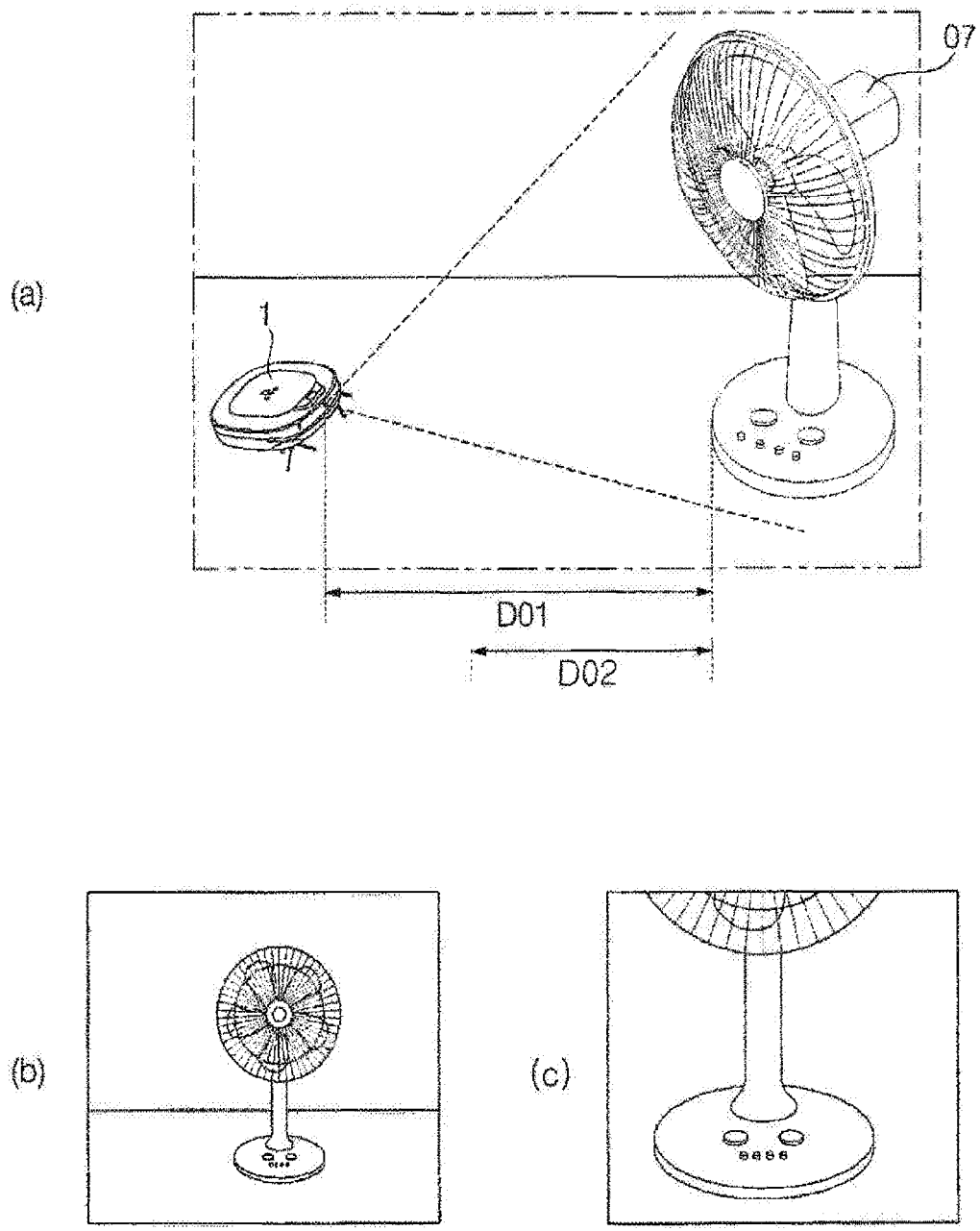
FIG. 10 is a diagram for explaining an operation of a mobile robot depending on a type of an obstacle according to an embodiment of the present disclosure.

FIG. 9 is a diagram for explaining recognition of a detection signal of an obstacle and recognition of the obstacle in a mobile robot according to an embodiment of the present disclosure. FIG. 10 is a diagram for explaining an operation of a mobile robot depending on a type of an obstacle according to an embodiment of the present disclosure.

As shown in FIG. 9A, when detecting that an obstacle is positioned within a predetermined distance, the obstacle detector 100 may input a detection signal thereof.

When a pattern acquirer photographs a pattern emitted from a pattern emission unit, the obstacle detector 100 may display the pattern P1 emitted to the obstacle as shown in the drawing.

As a pattern is positioned above a reference line ref1, the obstacle recognition unit 111 may determine that an obstacle with a predetermined height is positioned at a side toward a traveling direction.

Thus, the traveling controller may set a plurality of performable response motions with respect to an obstacle positioned ahead of the mobile robot in response to a detection signal. For example, the response motion such as avoidance, approaching, entrance, or pass may be set.

When a detection signal is input, the obstacle recognition unit 111 may analyze pre-captured image data, that is, image data captured before the detection signal is input and may determine an obstacle positioned at a side toward a traveling direction.

When a pattern is emitted to a lower portion of an air conditioner as shown in FIG. 9B, when a pattern is emitted to a support of a fan as shown in FIG. 9C, when a pattern is emitted to a threshold as shown in FIG. 9D, and when a pattern is emitted to a small box as shown in FIG. 9E, the aforementioned pattern shown in FIG. 9A may be photographed to form an image.

Despite different obstacles, as the same pattern is detected, the obstacle recognition unit 111 may determine the obstacles based on a pre-captured image.

As shown in FIG. 10, an image captured before a detection signal is input may be analyzed, and an obstacle positioned at a side toward a traveling direction may be determined to be a fan.

As shown in FIG. 10A, when the mobile robot 1 stores an image captured while traveling and the obstacle detector 100 detects an obstacle to be positioned within a predetermined distance, the obstacle recognition unit 111 may analyze a pre-captured image, may recognize an obstacle photographed in image data, and may determine information on the obstacle, such as the type, size, or shape of the obstacle.

The obstacle recognition unit 111 may analyze image data captured before the detection signal is input, that is, image data captured at a time point at which the obstacle is photographed at a farther distance than a predetermined distance.

For example, when a detection signal is input at a second distance D02, the obstacle recognition unit 111 may photograph only a portion of an obstacle at the second distance as shown in FIG. 10C, and thus, an image shown in FIG. 10B, which is captured before a detection signal of an obstacle is input, that is, at a predetermined time before a time point of inputting the detection signal, and the obstacle may be determined. The obstacle recognition unit 11111 may captures an image in the same traveling direction.

When a traveling direction of the body is changed, the obstacle recognition unit 111 may determine an obstacle from an image captured after the traveling direction is changed.

The traveling controller may determine that the obstacle is a fan through an image among a plurality of response motions based on a detection signal, as shown in FIG. 9C, and may perform a response motion thereto. For example, when the obstacle is a fan, the mobile robot may be confined below the fan or may be put above a support of the fan, and thus, a response motion (avoidance after approaching at a predetermined distance) may be set to avoid the obstacle without approaching the fan at 10 cm or greater, and may control the traveling unit to operate according to the response motion.

When the obstacle is determined as a box through an image as shown in FIG. 9E, the mobile robot may approach and collide with the box, may check whether the mobile robot is capable of traveling, and may then be set to avoid the obstacle. When the box is light, a position thereof may be changed by the mobile robot, and thus, the response motion may be set to enable the mobile robot to approach and collide with the obstacle.

The controller 110 may store information on a detected obstacle as obstacle data.

The obstacle data may be data of an obstacle that is frequently detected a plurality of detection numbers of times of the obstacle.

The traveling controller 113 may additionally determine whether an obstacle is a dangerous obstacle depending on a type of the obstacle and may control the traveling unit to perform an operation corresponding thereto. When an operation is determined depending on a type of the obstacle, the traveling controller 113 may perform the determined operation, and when an operation is not separately determined, the traveling controller 113 may vary and set an approaching degree of the obstacle depending on whether an obstacle is a dangerous obstacle. When the obstacle is a dangerous obstacle, the traveling controller 113 may output a predetermined sound effect or warning horn depending on a type of the obstacle and may output voice guidance. The traveling controller 113 may set a damageable obstacle such as a pot or a vase, a pet, a confinable leg, or the like, as a dangerous obstacle.

Even if the same detection signal is input and the same obstacle is positioned, the obstacle recognition unit 111 may perform different response motions depending on the size or shape of the obstacle.

For ex ample, when a detection signal for determining a chair leg is input, if the obstacle is determined as a chair from an image, an operation such as avoidance, approaching, or entrance may be performed depending on the height of the chair and an interval between legs. The obstacle recognition unit 111 may analyze an image after the detection signal is input, may calculate the interval between chairs and the height of the chair, and may determine whether the mobile robot enters the obstacle. Thus, the traveling controller may perform any one of response motions such as avoidance, approaching, and entrance.

Figure 11:
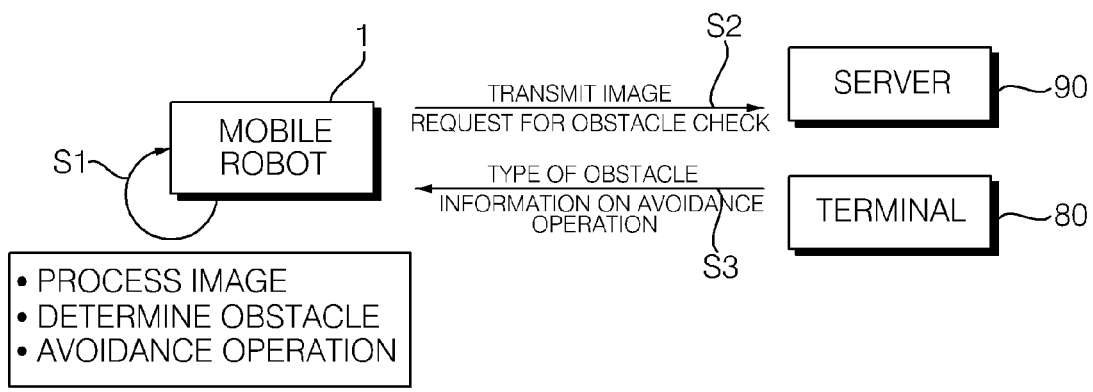
FIG. 11 is a diagram for explaining a mobile robot and a signal flow between devices for obstacle recognition according to an embodiment of the present disclosure.

FIG. 11 is a diagram for explaining a mobile robot and a signal flow between devices for obstacle recognition according to an embodiment of the present disclosure.

As shown in FIG. 11, the mobile robot 1 may perform cleaning while traveling in a traveling zone.

The mobile robot 1 may capture an image while traveling and may store the image as image data.

The mobile robot 1 may capture an image irrespective of whether an obstacle is detected and may recognize an obstacle positioned at a side toward a traveling direction from the image.

When determining the obstacle through the image, the controller 110 may analyze the image based on the stored obstacle information and may determine the obstacle (S1).

In this case, according to the first embodiment, the mobile robot 1 may analyze the image and recognize the obstacle while continuously capturing the image when the obstacle detector 100 detects the obstacle.

The controller 110 may store image data, and when the obstacle detection unit detects the obstacle, the controller 110 may analyze pre-captured image data, may remove a background, and may extract features when the obstacle is positioned within a predetermined distance. The obstacle recognition unit 111 may determine the shape, size, and type of the obstacle.

With respect to the obstacle from the image, when the obstacle is detected to be positioned within a predetermined distance, the mobile robot 1 may travel and avoid the obstacle depending on a type of a pre-recognized obstacle through the image.

According to the second embodiment, the mobile robot 1 may store image data, may analyze and filter image data stored in a predetermined unit to extract features, and may determine the shape, size, and type of the obstacle. That is, even if a detection signal of an obstacle is not input from the obstacle detection unit, the mobile robot according to the second embodiment may recognize the obstacle included in the image before the detection signal is input.

When the obstacle detector 100 inputs the detection signal in a state in which the obstacle is completely determined, the controller may set a response motion to the obstacle based on determination of the obstacle through the detection signal and the image and may perform a predetermined operation when the obstacle is positioned within a predetermined distance.

The mobile robot 1 according to the first and second embodiments may transmit the image data to the server 90 or the terminal 80 and may request that the server 90 check the obstacle (S2).

The server 90 may analyze image data, may extract the feature of the obstacle, and may determine a type of the obstacle based on a shape thereof. The server 90 may store accumulating data of the obstacle in a database and may use the data to determine the obstacle.

When recognizing a new obstacle from an image, the server 90 may generate a recognition model of the obstacle and may update obstacle information. The recognition model may include information on the feature of the obstacle and a generated environment to determine the type of the obstacle from the image. The recognition model may be used to set a response motion to the corresponding obstacle, and when receiving images of similar obstacles, the recognition model may analyze the feature based on a pre-generated obstacle model, may determine a type of the obstacle, and may set the response motion thereto as an avoidance operation. For example, when a specific obstacle is detected, a response motion may be set with respect to whether the mobile robot immediately avoids a corresponding obstacle without approaching the obstacle, whether the mobile robot approaches the obstacle at a predetermined distance and then avoids the obstacle, or whether a predetermined warning horn is output.

When the mobile robot 1 is not capable of accessing a server, the terminal 80 may transmit image data received from the mobile robot to the server. The terminal 80 may determine the type of the obstacle based on the received image data and may determine a type of the obstacle through user input.

The server 90 or the terminal 80 may transmit data of a type of the obstacle to the mobile robot 1 in response to a request of the mobile robot (S3). In addition, the server 90 or the terminal 80 may transmit data of an avoidance operation corresponding to the type of the obstacle to the mobile robot 1. The mobile robot 1 may perform the avoidance operation based on the received data.

The mobile robot 1 may determine the type of the obstacle based on the received data and may perform the avoidance operation in response thereto. The avoidance operation may also be set from a server or a terminal, and as necessary, any one of a plurality of operations may be selected and performed. As necessary, any one of a plurality of operations may be selected and input through the terminal.

Figure 12:
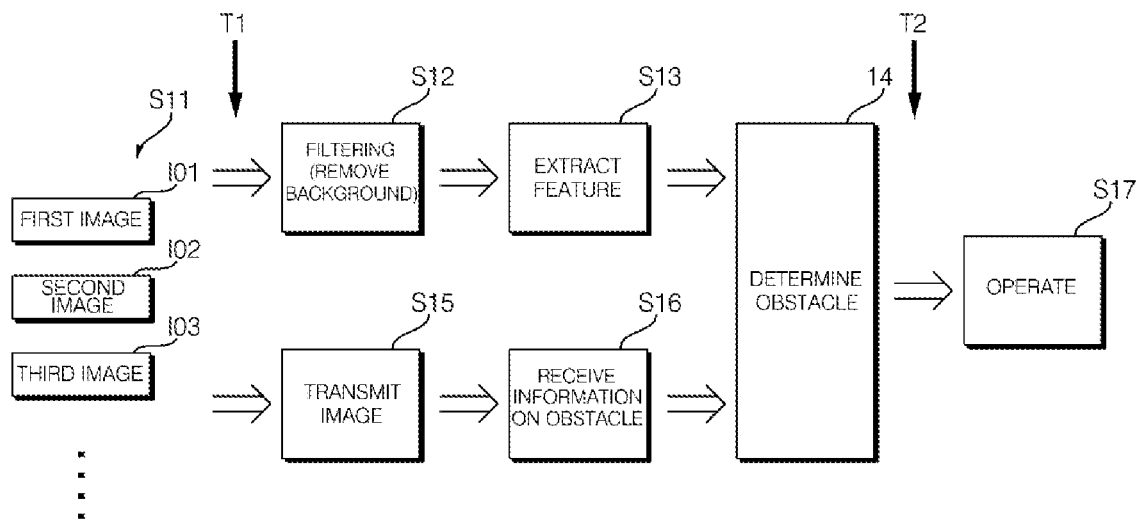
FIG. 12 is a flowchart for explaining detection of an obstacle and a response motion in a mobile robot according to an embodiment of the present disclosure.

FIG. 12 is a flowchart for explaining detection of an obstacle and a response motion in a mobile robot according to an embodiment of the present disclosure.

As shown in FIG. 12, the mobile robot 1 may capture a plurality of images through the image acquirer 170 while traveling. The controller 110 may capture an image while traveling even if any obstacle is not detected through the obstacle detection unit.

The image may be captured as a still image at a predetermined time interval or may be captured as a video image through continuous photography. The image acquirer 170 may store the captured images in a plurality of image data 101 to 103 in a data unit (S11).

The image processor included in the image acquirer 170 may filter a captured image and may store image data at a predetermined time interval, and when a video image is captured, the image processor may analyze the video image in frame units, may remove unnecessary frames, and may then store image data.

According to the first embodiment, the controller 110 may store image data, and when the obstacle detection unit detects an obstacle (T1), if the obstacle is positioned within a predetermined distance, the controller 110 may analyze pre-captured image data and may remove a background (S12), and may extract features (S13). The obstacle recognition unit 111 may determine the shape, size, and type of the obstacle (S14).

The controller 110 may set a plurality of response motions in response to an obstacle determined through a detection signal and an image. The controller 110 may select any one the plurality of determined response motions and may control the traveling unit to perform the selected response motion (S17).

According to the second embodiment, before the obstacle detector 100 inputs the detection signal, the controller 110 may analyze and filter the image data in predetermined units to extract features (S12 and S13) and may determine shape, size, or type of the obstacle (S14). When the obstacle detector 100 inputs the detection signal in a state in which the obstacle is completely determined, (T2), the controller may set a response motion to the obstacle and may perform a predetermined operation based on determination of the obstacle through the detection signal and the image (S17).

The controller 1110 may transmit a plurality of image data to the server (S15) and may request that the server determine the obstacle. When receiving data of the obstacle from the server, the controller 110 may store obstacle information (S16) and may determine the obstacle based on the information (S14).

The controller 110 may set a response motion and may perform the response motion based on the detection signal of the obstacle detector 10 and the image (S17).

Figure 13:
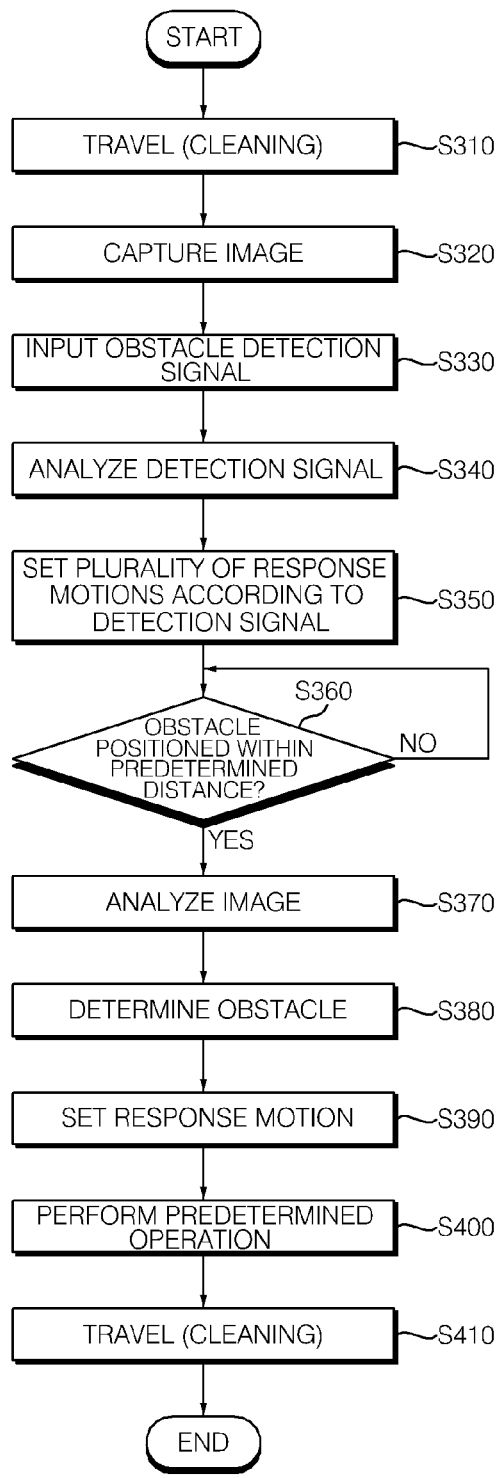
FIG. 13 is a flowchart for explaining recognition of an obstacle and a control method based thereon in a mobile robot according to a first embodiment of the present disclosure.

FIG. 13 is a flowchart for explaining recognition of an obstacle and a control method based thereon in a mobile robot according to the first embodiment of the present disclosure.

As shown in FIG. 13, the mobile robot 1 may travel in a region of the traveling region H, in which the mobile robot 1 is capable of traveling, and may clean a predetermined region (S310).

When receiving a moving or cleaning command, the mobile robot 1 may capture an image through the image acquirer 170. The image acquirer 170 may continuously capture an image (a video image) or may capture an image at a predetermined time interval (S320). The captured acquired image may be stored as image data.

The image acquirer 170 may set a photography period depending on a moving speed of the mobile robot or may set the photography period based on a distance for detecting an obstacle by the obstacle detection unit.

With respect to a plurality of image data, the image acquirer 170 may determine whether an obstacle is capable of being recognized, may filter the image data, may select an image that is capable of being analyzed, and may store the image as image data.

For example, the image acquirer 170 may select a normally captured image and may store the image as image data except for the case in which the obstacle is not capable of being normally photographed due to movement of the obstacle or movement of the body 10 during photography, e.g., the case in which it is not possible to recognize the obstacle due to a shaking image of the obstacle as a photography target or the case in which it is not possible to recognize the obstacle due to an unfocused image.

The image acquirer 170 may capture an image while the mobile robot 1 is operated, and the obstacle detector 100 may emit a pattern or may detect an obstacle positioned at a side toward a traveling direction using ultrasonic waves, infrared rays, or laser beams and may input the detection signal (S300).

The obstacle recognition unit 111 may determine whether an obstacle is positioned at a side toward a traveling direction based on the detection signal or may determine the size or position of the obstacle through pattern analysis using a 3D sensor (S340).

When determining the obstacle through the shape of a pattern obtained by emitting the pattern, the controller 110 may separate and identify obstacles with the same detection signal being input and may set a plurality of performable response motions for respective detection signals (S350).

A detectable distance is changed depending on a type of a sensor of the obstacle detection unit, and thus, the controller 110 may determine a distance to the obstacle based on the detection signal and may determine whether the obstacle is positioned at a predetermined distance (S360).

The controller 110 may determine a plurality of performable response motions with respect to an obstacle positioned at a side toward a travelling direction depending on a shape of the detection signal, and when the obstacle is positioned within the predetermined distance, the controller 110 may analyze image data prior to a time point of pre-photography (S370), and may determine the obstacle (S380).

The obstacle recognition unit 111 may analyze image data, may filter the image data depending on whether it is possible to recognize the obstacle, may remove a background from the filtered image data through image processing, and may then extract an outline or feature point of the obstacle to extract the shape and shape of the obstacle.

The obstacle recognition unit 111 may determine whether image data is identified based on the brightness and clarify of image data, and a moving speed of the body 10. The obstacle recognition unit 111 may determine the brightness of the image data based on a brightness value of a plurality of pixel values of the image data and may classify the brightness value into excessive exposure, insufficient exposure, and normal exposure. When the moving speed of the body is equal to or greater than a setting speed, the obstacle recognition unit 111 may determine a captured image to shake, may determine the clarity of the image data, and may determine whether it is possible to identify the image data.

The obstacle recognition unit 111 may extract the extracted outline and feature of the obstacle to analyze a shape of the obstacle and may determine the type and size of the obstacle based on obstacle data.

When there is no separate obstacle data or it is not possible to determine a type of the obstacle from obstacle data, the obstacle recognition unit 111 may transmit the image data to the server 90 or the terminal and may request that the server 90 or the terminal check the obstacle. The obstacle may be determined through the server immediately when the image is captured. The type of the obstacle may be determined via autonomous determination or response from the server.

The server 90 may store a plurality of image data with respect to one obstacle, may extract the features of a specific obstacle, and may store the features in a database. The server 90 may analyze image data received from the mobile robot 1 and may compare the image data with pre-stored data, and thus, may determine a type of the obstacle. The server 90 may transmit a type of the obstacle and obstacle data related thereto to the mobile robot 1.

The obstacle recognition unit 111 may set any one of a plurality of response motions based on data of an obstacle determined in response to the shape and feature of the obstacle (S390).

The traveling controller may control the traveling unit to perform an operation based on the set response motion (S400).

In the case of a dangerous obstacle, the traveling controller 113 may set the traveling unit to travel to avoid the obstacle without approaching the obstacle at a predetermined distance or greater. When there is a predetermined operation depending on a type of the obstacle, the traveling controller 113 may perform the predetermined operation.

The traveling controller 113 may set the traveling unit to avoid an obstacle after approaching the obstacle or to immediately avoid the obstacle when a predetermined distance is reached, may set an approaching distance when the mobile robot approaches the obstacle, and may set the traveling unit to enter and pass through an obstacle. In addition, the mobile robot may also output a predetermined warning horn.

Thus, even if the same detection signal is input, the mobile robot 1 may perform different operations depending on an obstacle via image analyze, and even if detection signals are the same and obstacles have the same type, different response motions may be performed depending on the size or shape of the obstacle.

According to the present disclosure, when the mobile robot approaches the obstacle at a predetermined distance, a predetermined operation may be performed, and thus, the mobile robot may immediately response to the obstacle, and the obstacle may be easily determined using a pre-captured image, and accordingly, the obstacle may be more effectively avoided.

Figure 14:
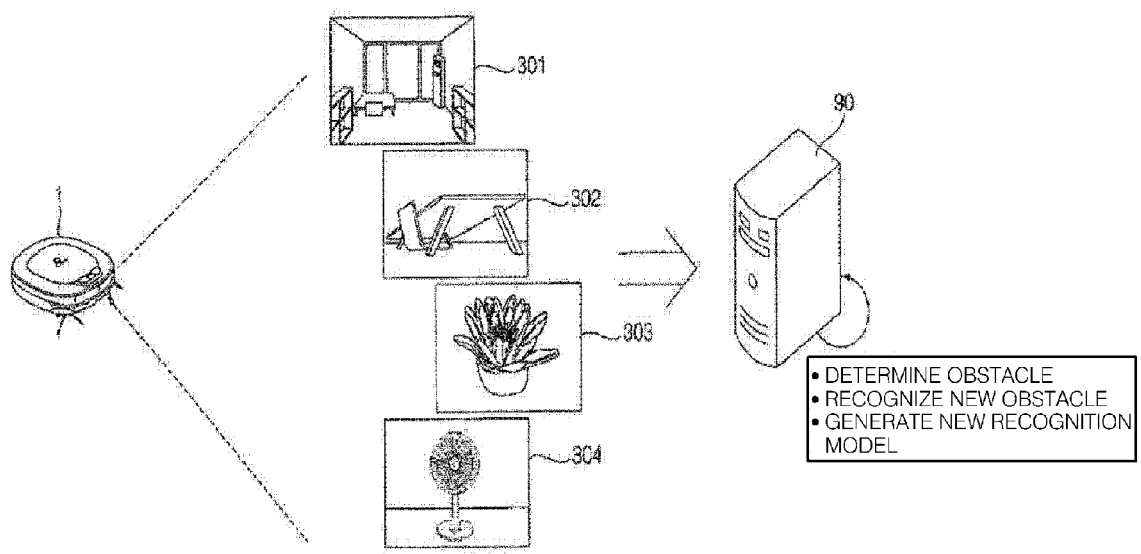
FIG. 14 is a diagram for explaining image transmission for recognition of an obstacle of a mobile robot according to a second embodiment of the present disclosure.

FIG. 14 is a diagram for explaining image transmission for recognition of an obstacle of a mobile robot according to the second embodiment of the present disclosure.

The mobile robot 1 according to the second embodiment may capture a plurality of images through the image acquirer 170 while traveling. The controller 110 may capture an image even if the obstacle detection unit does not detect an obstacle.

As shown in FIG. 14, the mobile robot 1 may capture a plurality of images 301 to 304 while traveling. The mobile robot 1 may store an image captured at a predetermined time interval as image data, may transmit the image data to the server 90, and may make a request for information on the obstacle.

The mobile robot 1 may periodically capture a still image and may capture a video through continuous photography. The image acquirer 170 may store the captured image in a data unit as a plurality of image data 301 to 304.

The image processor included in the image acquirer 170 may filter a captured image and may store the image data at a predetermined time interval or a predetermined moving distance interval, and when a video image is captured, the image processor may analyze the video image in frame units, may remove unnecessary frames, and may then store image data.

The mobile robot 1 may transmit image data captured while traveling to the server according to a time sequence and may selectively transmit some of the plurality of image data.

For example, when recognizing an obstacle at a side toward a traveling direction from an image, the mobile robot 1 may transmit corresponding image data to the server.

The server 90 may analyze a type of an obstacle and may transmit the obstacle information to the mobile robot 1, and the mobile robot 1 may perform an avoidance operation on the obstacle in response to the received obstacle information. The avoidance operation may be an operation of approaching an obstacle, changing a traveling direction in response to a type of the obstacle, and then, avoiding the obstacle, an operation of approaching the obstacle only at a predetermined distance, or an operation of avoiding the obstacle and traveling immediately after the obstacle is detected. The mobile robot 1 may output a predetermined warning horn, sound effect, and voice guidance in response to the type of the obstacle, and may also re-travel after a predetermined time elapses.

When the same image is repeatedly captured within a predetermined time, the mobile robot 1 may transmit a plurality of image data captured within a predetermined time to the server.

For example, when the mobile robot 1 is confined by a space below a chair or a table and it not capable of traveling, the mobile robot 1 may output an error, may transmit, to the server, image data captured within a predetermined time or image data captured while traveling for a predetermined distance, may receive information on the obstacle, and thus, may determine a current confinement situation. The mobile robot 1 may determine that the mobile robot is not capable of traveling due to a confinement situation and may output an error based thereon.

The server 90 may analyze the received image data and may generate a recognition model of a confinement situation of the mobile robot.

The server 90 may analyze a plurality of image data captured for a predetermined distance or a predetermined time by a mobile robot as well as a confined positioned of the mobile robot, may analyze an image before a confinement situation occurs, and may generate a recognition model to enable the mobile robot to avoid the corresponding obstacle through the image. The server 90 may generate obstacle information based on the generated recognition model and may transmit the information to the mobile robot.

The server 90 may analyze the reason for a confinement situation based on information on an obstacle around a place when the confinement situation occurs, and information on a surrounding obstacle before a confinement situation occurs. The server 90 may determine that a confinement situation occurs with respect to an obstacle with a similar shape and size to the corresponding obstacle, may additionally set a response motion with respect to the confinement situation, and may update obstacle information.

The mobile robot 1 may travel to avoid the obstacle before approaching the obstacle in which a confinement situation occurs in response to the obstacle information received from the server and may prevent the confinement situation from occurring.

The server 90 may analyze the obstacle in which the confinement situation occurs to calculate statistics, may determine a candidate group of the obstacle in which the confinement situation occurs, and may output warning.

For example, a plurality of image data of a table may be analyzed, an image of a table in which a confinement situation occurs and an image of a table in which a confinement situation does not occur may be differentiated therebetween and may be compared with each other, and when a type of the obstacle is a table, the feature of the obstacle in which the confinement situation occurs may be extracted, and a candidate group of the confinement situation may be determined.

For example, when the height of the table is equal to or less than 20 cm, when an interval between table legs is equal to or less than 35 cm, when another obstacle is positioned below the table, or the table has five legs or greater, features may be extracted, and a candidate group of the confinement situation may be set. The server may determine a response motion to the confinement situation with respect to a corresponding candidate group.

As necessary, although a confinement situation does not occur, when the confinement situation occurs in another obstacle with a similar shape, the server may generate a candidate group of an obstacle in which a confinement situation occurs and may set a response motion to avoid the corresponding obstacle. The mobile robot may enter the corresponding obstacle, and the server may output a warning horn or voice guidance before entering the obstacle and may set the response motion to enable the mobile robot to enter the obstacle after a predetermined time elapses.

Thus, with respect to an obstacle in which a confinement situation occurs, when detecting the corresponding obstacle, the mobile robot 1 may change a traveling direction and may travel to avoid the obstacle immediately after approaching the obstacle at a predetermined distance or immediately when detecting the obstacle. When avoiding the obstacle, the mobile robot 1 may output voice guidance therefor. For example, the mobile robot 1 may output voice guidance 'I am traveling and avoiding obstacle of confinement situation'.

When detecting a similar obstacle to an obstacle in which a confinement situation occurs based on received obstacle information, the mobile robot 1 may output voice guidance 'If I continuously travels, confinement situation may occur' in a state of temporary pause and may then travel. After voice guidance, when receiving a predetermined command by a user, the mobile robot may continuously travel or may change a traveling direction and may travel in response thereto.

When an object falls while traveling, the mobile robot 1 may determine a dangerous situation and may transmit a plurality of image data captured prior thereto to the server.

The server 90 may analyze a plurality of image data, may determine an obstacle as the reason for making an object fall, may extract the feature of the corresponding obstacle, may set a response motion, and may then generate obstacle information.

For example, in a state in which a vase is put on a table, when the mobile robot collides with the table, the vase may fall. The server may generate a new recognition model of the table on which the vase is put, may generate a response motion not to approach the table at a predetermined distance or greater, and may transmit the obstacle information to the mobile robot.

Thus, when detecting that the vase is put on the table, the mobile robot 1 may travel and avoid the obstacle without approaching a predetermined distance or greater.

Figure 15:
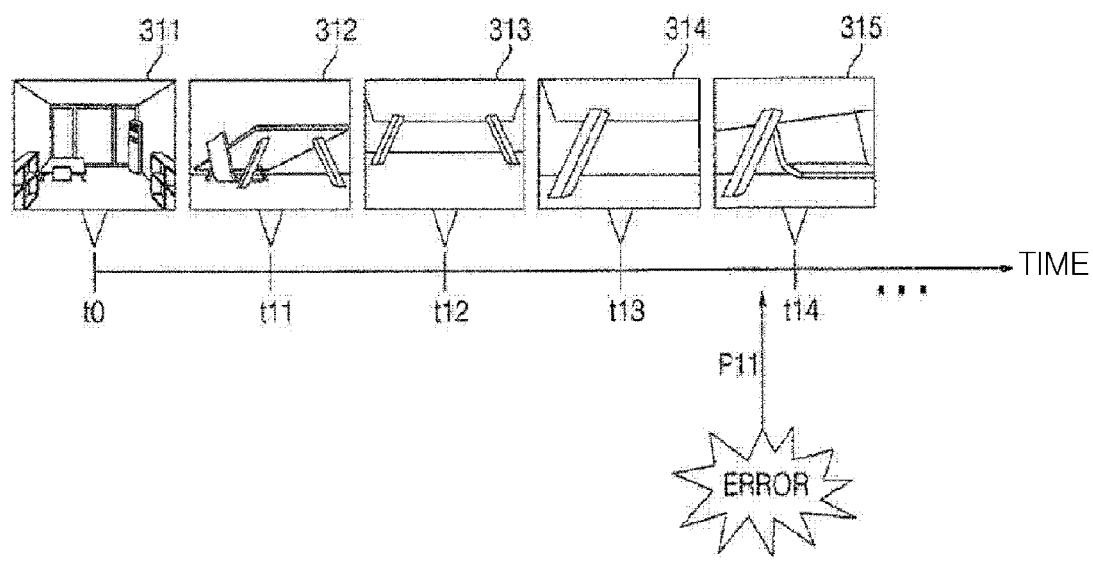
FIG. 15 is a diagram for explaining a method of determining a confinement situation through an image of a mobile robot according to the second embodiment of the present disclosure.

FIG. 15 is a diagram for explaining a method of determining a confinement situation through an image of a mobile robot according to the second embodiment of the present disclosure.

As shown in FIG. 15, the mobile robot 1 according to the second embodiment may capture images 311 to 315 at a predetermined time interval and may store a plurality of image data. The mobile robot 1 may store the image data with time information.

The image acquirer 170 may continuously capture an image or may repeatedly capture the image with a predetermined period. When the mobile robot 1 travels for a predetermined distance, the obstacle may be photographed in an enlarged form as the mobile robot approaches the obstacle.

The mobile robot 1 may analyze a captured image, may recognize the obstacle, may transmit the result to the server 90, and may receive obstacle information.

While traveling, the mobile robot 1 may capture and store first to fifth images 311 to 315 at a $0^{th}$ time t0, an $11^{th}$ time t11, a $12^{th}$ time t12, a $13^{th}$ time t13, and a $14^{th}$ time t14 through the image acquirer 170 for a predetermined time interval or a predetermined moving distance interval. For example, the mobile robot 1 may capture an image every moving distance of 10 cm. In addition, the mobile robot 1 may capture an image at an interval of 10 seconds while traveling.

While traveling, when a moving distance is less than a predetermined distance for a predetermined time, the mobile robot 1 may determine a confinement situation. For example, when the mobile robot 1 does not move for 5 cm or greater and a predetermined time, the mobile robot 1 may determine the confinement situation.

When determining the confinement situation, the mobile robot 1 may transmit image data that is captured before a predetermined time from a time point P11 of determining the confinement situation or image data that is captured before a predetermined moving distance to the server 90.

The mobile robot 1 may transmit an image captured prior to a predetermined moving distance, that is, $12^{th}$ to $14^{th}$ images 312 to 314, based on a moving distance to the server 90. The mobile robot 1 may transmit an image during the $11^{th}$ time t11 to the $13^{th}$ time t13, that is, the $12^{th}$ to $14^{th}$ images 312 to 314, to the server 90.

The mobile robot 1 may transmit image data and error information to a terminal or the like and may output information on error due to a confinement situation and a current position through the terminal.

The server 90 may recognize an obstacle from each image, may analyze the obstacle as the reason for the confinement situation, and may generate a recognition model to prevent the mobile robot from approaching or entering the corresponding obstacle. The server 90 may analyze the feature of the corresponding obstacle and may apply the same recognition model to similar obstacles.

As shown in the drawing, when a confinement situation occurs below the table, the server 90 may detect a corresponding table and may generate a recognition model with a response motion that is set to prevent the mobile robot from entering a space below the table. When obstacle information with respect to the corresponding table is pre-generated, the server 90 may add information on the confinement situation and may re-generate a recognition model.

The mobile robot may update new obstacle information or pre-stored obstacle information and may travel and avoid the obstacle to prevent the confinement situation from occurring. A position at which the confinement situation occurs may be set in a pre-stored map.

Thus, during next traveling, when an image such as the $12^{th}$ image 312 is captured, the mobile robot 1 may detect the table through an image and may travel and avoid the obstacle after approaching the obstacle at a predetermined distance without entering the table according to a response motion on the corresponding table. As necessary, the mobile robot 1 may output voice guidance for the confinement situation during avoidance traveling.

When detecting an obstacle with a similar shape to the table, the mobile robot 1 may travel and avoid the obstacle in the same way.

Figure 16:
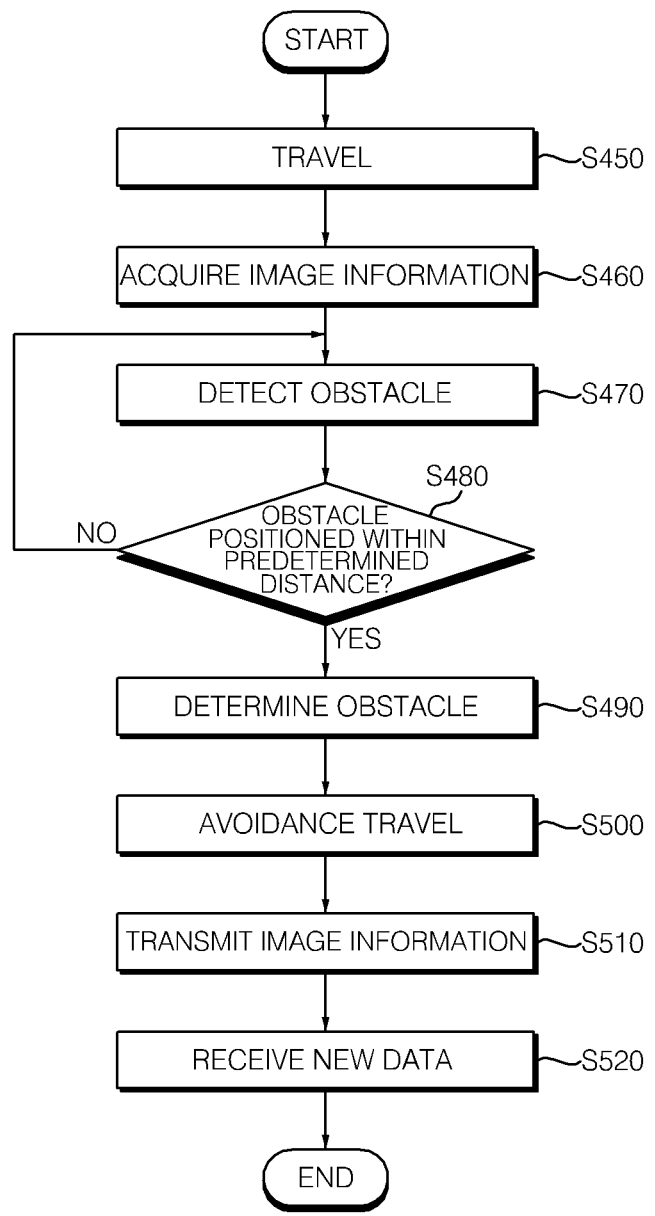
FIG. 16 is a diagram for explaining a method of controlling a mobile robot according to the second embodiment of the present disclosure.

FIG. 16 is a diagram for explaining a method of controlling a mobile robot according to the second embodiment of the present disclosure.

As shown in FIG. 16, while traveling (S450), the mobile robot 1 may periodically capture an image in a traveling direction and may acquire image information (S460). The image acquirer 170 may capture an image, may store the image, and may store the image in a data unit as recognizable image data.

While traveling, the obstacle detector 100 may detect an obstacle positioned at a side toward a traveling direction and may apply a predetermined detection signal to an obstacle recognition unit. The pattern emission units 120 and 130 may emit a pattern with a predetermined shape in a traveling direction, may photograph the corresponding pattern through the pattern acquirer 140, and may input the image to the obstacle recognition unit 111.

The obstacle recognition unit 111 may analyze an image input from the image acquirer 170 to extract features and may determine a type of the photographed obstacle based on obstacle data pre-stored in the data unit 180 (S470).

The controller 110 may transmit image data to the server and may make a request for obstacle information. The controller 110 may determine a type of the photographed obstacle in the image based on data received from the server. The controller 110 may receive and set information on at least a performable response motion on the obstacle as well as the type of the obstacle from the obstacle information.

With respect to the pre-determined obstacle, the obstacle recognition unit 111 may detect whether the corresponding obstacle is positioned within a predetermined distance through the obstacle detector 100 (S480).

When the obstacle recognition unit 111 recognizes that an obstacle is positioned within a predetermined distance, the traveling controller 113 may determine the pre-recognized obstacle from the image (S490), may set any one of a plurality of response motions in response to a type of the corresponding obstacle, and may control the traveling unit 250 to avoid the obstacle (S500).

The traveling controller 113 may perform a response motion including at least one combination of approaching, entrance, passing, and avoidance with respect to the obstacle in response to the pre-determined type of the obstacle. The controller 110 may output a predetermined warning horn, sound effect, and voice guidance through the output unit 190.

When a response motion is set to enable the mobile robot to enter the detected obstacle, the traveling controller 113 may control the traveling unit 250 to enable the body to continuously travel.

For example, when a table is detected, the traveling controller 113 may change a traveling direction after the body approaches the body and may enable the mobile robot to enter a space below the table and to continuously travel.

The obstacle recognition unit 111 may continuously analyze an image captured while traveling to determine a type of the obstacle, and when the obstacle detector 100 detects the obstacle within a predetermined distance, the traveling controller 113 may set a response motion of the corresponding obstacle and may control the traveling unit.

The controller 110 may transmit image data to the server 90 and may make a request for information on the obstacle (S510).

The server 90 may analyze image data received from a plurality of mobile robots to determine a type of an obstacle, may update information on the pre-determined obstacle, and may generate a recognition model of a new obstacle. The server 90 may transmit obstacle information or updated obstacle information based on a recognition model that is newly generated according to a request of the mobile robot, to the mobile robot.

The mobile robot 1 may store data received from a server and may update pre-stored obstacle information. The mobile robot 1 may determine the obstacle based on new data, may transmit the determined information to the server, and may check information on the obstacle.

When a confinement situation occurs in the pre-recognized obstacle, the mobile robot 1 may transmit a plurality of image data that is captured before a confinement situation occurs to the server and may make a request for new information on the confinement situation.

The server 90 may analyze a plurality of image data, may determine a surrounding obstacle before a confinement situation occur, may identify the obstacle as the reason for the confinement situation, and may set a response motion.

The server 90 may newly generate a recognition model of an obstacle in which a confinement situation occurs, may newly set a response motion therefor, and may transmit obstacle information to the mobile robot.

Thus, the mobile robot 1 may change pre-stored data and may perform a response motion on the obstacle depending on new obstacle information. When a confinement situation occurs, the mobile robot may indicate occurrence of the confinement situation at a corresponding position, and as necessary, may set a virtual wall.

While traveling, when the obstacle recognized from an image is an obstacle in which the confinement situation occurs, the mobile robot 1 may travel and avoid the corresponding obstacle according to the response motion that is set when the obstacle detector 100 detects the corresponding obstacle.

Figure 17:
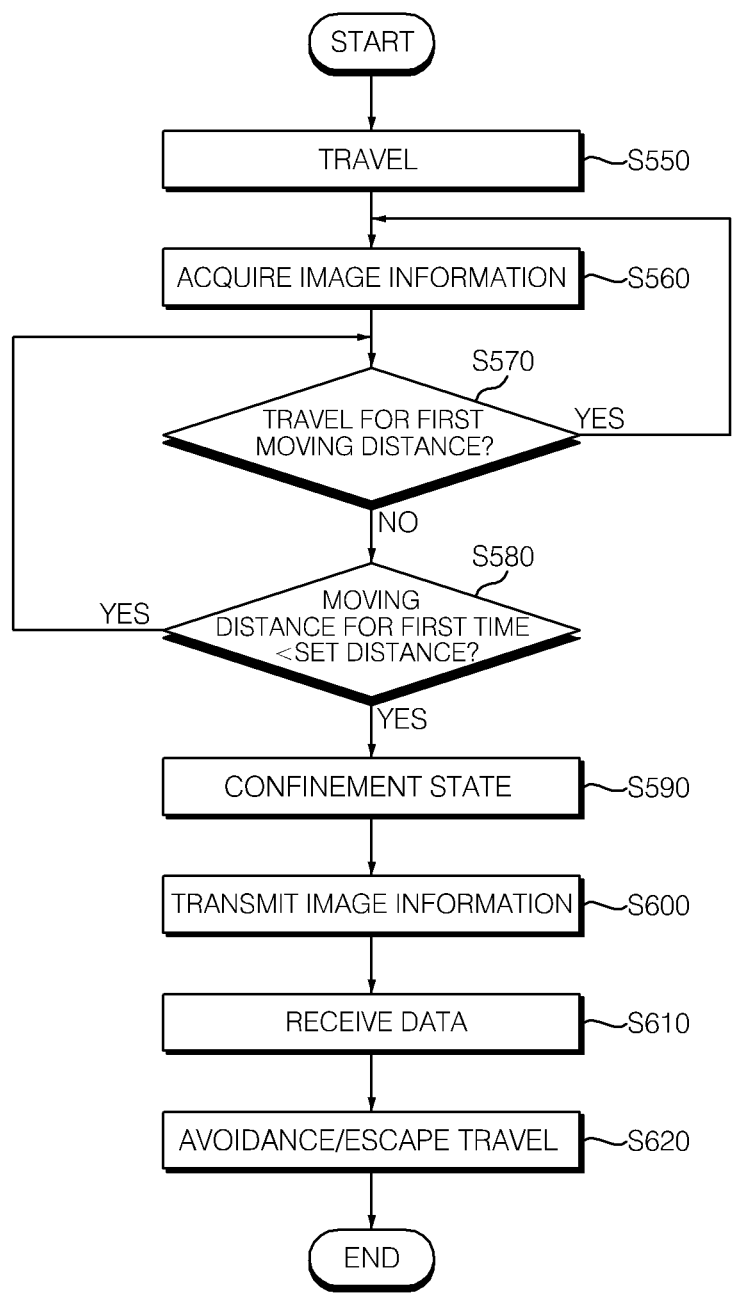
FIG. 17 is a flowchart for explaining a method of determining error of a mobile robot according to the second embodiment of the present disclosure.

FIG. 17 is a flowchart for explaining a method of determining error of a mobile robot according to the second embodiment of the present disclosure.

As shown in FIG. 17, while traveling (S550), the mobile robot 1 may periodically capture an image in a traveling direction through the image acquirer 170 (S560). The image acquirer may capture an image and may store the image at a predetermined time interval or a predetermined distance interval.

The mobile robot 1 may recognize the obstacle from the captured image data and may determine a type of the obstacle. The image acquirer 170 may store the image data captured while traveling, and the controller may analyze image data with a predetermined period and when the obstacle is determined or the obstacle is detected to be positioned at a predetermined distance by the obstacle detector 100, the controller may determine the obstacle using pre-captured image data. The controller 110 may transmit image data to the server, may receive obstacle information, and may determine a type of the photographed obstacle based on the obstacle information.

The controller determines information on the type, shape, and size of the obstacle through image data, and thus, when the obstacle detection unit detects the obstacle to be positioned within a predetermined distance while traveling, the controller may control the traveling unit to perform the response motion in response thereto.

For example, when a detection signal of an obstacle is input with respect to a table, the controller 110 may select two response motions of avoidance after approaching and entrance, may analyze image data, and may determine and operate any one response motion depending on whether the mobile robot enters a space below the table.

While traveling, the traveling controller 113 may calculate a moving distance based on the number of times of rotation or a moving speed of a wheel of a traveling unit.

When an image is captured based on a moving distance, if the mobile robot moves for a predetermined first moving distance (S570), the traveling controller 113 may apply a control command to enable the image acquirer 170 to capture an image in units of a first moving distance. The traveling controller 113 may control the image acquirer 170 when the mobile robot moves for a predetermined time based on a moving time.

The traveling controller 113 may determine whether a moving distance for a set time, that is, a first time is less than a set distance (a second moving distance) while traveling (S580).

When the moving distance for the first time is less than the second moving distance, if the mobile robot is not capable of normally traveling, the traveling controller 113 may determine error. The traveling controller 113 may determine that the mobile robot is not capable of moving due to a surrounding obstacle and may determine a confinement situation (S590).

In this case, after the body enters the obstacle, the traveling controller 113 may determine whether the body is confined based on a moving distance per hour. For example, when a table is too low or an interval between table legs is narrow, or when another type of obstacle is present below the table, a confinement situation in which the body is not capable of normally traveling may occur.

When a moving distance for a set time is less than a set distance, the traveling controller 113 may determine that the body is confined. The traveling controller 113 may travel and avoid an obstacle in response to a type of the obstacle.

When determining a confinement situation, the traveling controller 113 may call a plurality of image data from a data unit for a previous predetermined time or a predetermined distance and may transmit the image data to the server 90 through a communicator (S600). A moving distance for the first time is less than the second moving distance, and thus, the mobile robot 1 may transmit information including image data before a confinement situation occurs, to the server.

The server 90 may analyze a plurality of received image, may analyze the image data received from another mobile robot to classify a type of the obstacle, may calculate required information depending on a type of the obstacle, and may set each response motion.

As the server 90 performs image analysis and learning through a plurality of image data, even if tables are present, recognition models may be respectively generated to perform different response motions depending on the shape and size of the tables, and thus, obstacle information may be newly generated based thereon, or pre-stored obstacle information may be updated. The server may set a plurality of response motions to be performed by the mobile robot and may provide obstacle information, and thus, the mobile robot may perform any one response motion.

The controller 110 may store obstacle information received from the server through the communicator in the data unit (S610).

The mobile robot may travel to avoid or escape from a confinement situation based on received data (S620). The controller may output error when the mobile robot is not capable of escaping from the obstacle and may output a warning horn. The controller may transmit a current position and a pre-captured image to a terminal and may enable the user to release the confinement situation of the body.

When photographing a table, the obstacle recognition unit may detect the table in which the confinement situation occurs through an image based on pre-stored obstacle information.

When determining that the obstacle is positioned within a predetermined distance, the traveling controller may travel to avid the table as the obstacle based on the changed obstacle information.

That is, in the case of initial detection, when a response motion is set to enable the body to enter the obstacle and then the confinement situation occurs, a response motion may be set as any one of avoidance after approaching or avoidance with respect to a corresponding obstacle and may enable the body to avoid or escape from the obstacle in the case of next detection.

Even if tables have the same type, the tables may have different sizes, spaces below the tables may have different sizes, and the size of the mobile robot may be changed, and thus, whether the mobile robot is capable of entering the tables may be changed, and accordingly, the controller may set a plurality of response motions, for example, a performable response motion to avoid, enter, or pass through the obstacle after approaching based on a detection signal of the obstacle detector 100, and in this case, may determine to set and perform any one of the plurality of response motions depending on the type, shape, and size of the obstacle via image analysis.

When other tables that are not the same but are similar to each other are detected, the controller 110 may determine whether a confinement situation occurs due to the tables and may set the mobile robot to avoid the obstacle without entering the obstacle. The mobile robot may also output a predetermined warning horn.

Thus, even if the same detection signal is input, the mobile robot 1 may perform different operations depending on an obstacle via image analysis, and even if the same detection signal and the same type of obstacles are present, the mobile robot 1 may perform different response motions depending on the size or shape of the obstacles.

According to the present disclosure, the mobile robot may immediately respond to an obstacle through a pre-captured image, and when a confinement situation occurs, the mobile robot may classify an obstacle as the reason for the confinement situation through a pre-captured image while traveling for a predetermined time or a predetermined distance and may travel and avoid the obstacle when detecting the corresponding obstacle, thereby preventing the confinement situation from occurring.

In addition, obstacle information may be updated by updating a new recognition model for an obstacle through a server, and thus, the mobile robot may avoid the obstacle in a similar situation, a confinement situation may be prevented from occurring and the mobile robot may continuously travel.

While this invention has been particularly shown and described with reference to exemplary embodiments thereof, it will be understood by those skilled in the art that various changes in form and details may be made therein without departing from the spirit and scope of the invention as defined by the appended claims.

| [Description of reference numerals] | |
|---|---|
| 1: mobile robot | 10: body |
| 100: obstacle detection unit | 110: controller |
| 111: obstacle recognition unit | |
| 113: traveling controller | |
| 120, 130: pattern emission unit | |
| 140: pattern acquirer | |
| 150: sensor unit | 170: image acquirer |
| 180: data unit | |
| 250: traveling unit | |
| 260: cleaner | |

What is claimed is:

1. A mobile robot comprising:
   a moveable body;
   an image acquirer configured to capture an image in a traveling direction;
   an obstacle detection unit configured to detect an obstacle positioned at a side toward the traveling direction; and
   a controller configured to store a plurality of image data captured through the image acquirer, to start a response motion at a predetermined time point at which the obstacle detection unit determines that the obstacle is positioned within a predetermined distance, and to determine the response motion depending on the determined obstacle based on the image data acquired prior to the predetermined time point,
   wherein the controller sets a plurality of response motions to be performed according to a predetermined type of a detection signal inputted by the obstacle detection unit, and selects any one of the plurality of response motions based on the image data.

2. The mobile robot of claim 1, wherein the controller performs control to perform different response motions based on the image data with respect to the detection signal that is input to be the same.

3. The mobile robot of claim 1, wherein the controller analyzes image data captured before a predetermined time based on a time point at which the obstacle detection unit determines that the obstacle is positioned at a predetermined distance and determines a shape and size of the obstacle or a type of the obstacle.

4. The mobile robot of claim 1, wherein the controller analyzes the image data and determines the obstacle before the detection signal is inputted by the obstacle detection unit.

5. The mobile robot of claim 1, wherein, when the detection signal is inputted by the obstacle detection unit, the controller analyzes the image data and determines the obstacle.

6. He mobile robot of claim 1, wherein the controller performs control to perform the response motion including at least one combination of stoppage, deceleration, acceleration, reverse, stand-by, avoidance, prevention of approach at a short distance, or voice guidance.

7. The mobile robot of claim 1, wherein the obstacle detection unit includes at least one of an ultrasonic sensor, a laser sensor, an infrared sensor, or a 3D sensor.

8. The mobile robot of claim 1, wherein the controller transmits the image data to a server or a terminal, requests that the server or the terminal check the obstacle, and determines a type of the obstacle in response to response data received from the server or the terminal.

9. The mobile robot of claim 1, wherein the controller determines whether the body is confined due to the obstacle in response to a traveling state, and the mobile robot escapes from a confinement situation in response to information on the obstacle, acquired from the at least one image data captured prior to the time point of determining confinement.

10. The mobile robot of claim 9, wherein the controller performs any one predetermined response motion among a plurality of response motions to prevent the body from being confined in response to the information on the obstacle and avoids the obstacle.

11. The mobile robot of claim 9, wherein the controller performs any one response motion to output warning for confinement among a plurality of response motions when the obstacle is included in a candidate for causing a confinement situation.

12. The mobile robot of claim 9, wherein the controller calculates a moving distance of the body, determines that the body is confined when a moving distance for a set time is less than a set distance, transmits at least one image data captured for a previous predetermined time before a time point of determining the confinement or captured while traveling for a previous predetermine distance to a server, and acquires the information on the obstacle.

13. A method of controlling a mobile robot, the method comprising:
   while traveling, capturing an image in a traveling direction and storing image data by an image acquirer;
   determining that an obstacle is positioned within a predetermined distance through an obstacle detection unit;
   determining a response motion depending on the determined obstacle based on the image data acquired prior to a predetermined time point of determining that the obstacle is positioned within a predetermined distance;
   starting a response motion on the obstacle at the predetermined time point; and
   operating based on the response motion and traveling to avoid and pass through the obstacle,
   wherein setting the response motion includes setting a plurality of response motions depending on a shape associated with a detection signal generated inputted by the obstacle detection unit and selecting any one of the plurality of response motion based on the image data.

14. The method of claim 13, further comprising:
   analyzing the image data and determining the obstacle before the detection signal is inputted by the obstacle detection unit and after an image is captured.

15. The method of claim 13, further comprising:
   when the detection signal is inputted by the obstacle detection unit, analyzing the image data and determining the obstacle.

16. The method of claim 13, further comprising:
   while traveling, determining whether a body is confined due to the obstacle in response to a traveling state; and
   when determining that the body is confined, escaping from a confinement situation in response to information on the obstacle, acquired from the at least one image data captured prior to a time point of determining confinement.

17. The method of claim 16, further comprising:
performing any one of the plurality of response motions and avoiding the obstacle to prevent the body from being confined in response to the information on the obstacle to prevent the body from being confined.

18. The method of claim 16, further comprising:
transmitting the image data to a terminal or a server; and
analyzing the at least one image data, recognizing a surrounding obstacle from image data captured before the body is confined, determining an obstacle as a reason for confinement, and generating the information on the obstacle.

* * * * *